US011921997B2

(12) United States Patent
Hellsten et al.

(10) Patent No.: US 11,921,997 B2
(45) Date of Patent: *Mar. 5, 2024

(54) USER INTERFACES AND METHODS FOR GENERATING A NEW ARTIFACT BASED ON EXISTING ARTIFACTS

(71) Applicant: NVIDIA Corporation, Santa Clara, CA (US)

(72) Inventors: Janne Hellsten, Helsinki (FI); Tero Tapani Karras, Helsinki (FI); Samuli Matias Laine, Vantaa (FI)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,557

(22) Filed: Jul. 22, 2022

(65) Prior Publication Data
US 2022/0398005 A1 Dec. 15, 2022

Related U.S. Application Data

(63) Continuation of application No. 17/343,995, filed on Jun. 10, 2021, now Pat. No. 11,435,885.

(51) Int. Cl.
*G06T 11/60* (2006.01)
*G06F 3/04817* (2022.01)
(Continued)

(52) U.S. Cl.
CPC ...... *G06F 3/04842* (2013.01); *G06F 3/04817* (2013.01); *G06F 3/04847* (2013.01); *G06T 11/40* (2013.01); *G06T 11/60* (2013.01)

(58) Field of Classification Search
CPC ............ G06F 3/04842; G06F 3/04817; G06F 3/04847; G06F 3/04845; G06T 11/04; G06T 11/60
See application file for complete search history.

(56) References Cited

U.S. PATENT DOCUMENTS 7,782,334 B1 * 8/2010 Kilgard .................... G06T 1/00
345/592
10,535,164 B2 1/2020 Schlens et al.
(Continued)

FOREIGN PATENT DOCUMENTS

GB 2604479 A 9/2022
WO 2020/226750 A1 11/2020

OTHER PUBLICATIONS

"Introduction to Artbreeder" (Screenshots of a video in YouTube) https://www.youtube.com/watch?v=IlrMkHaCosw published on Dec. 5, 2019.
(Continued)

*Primary Examiner* — Rinna Yi

(57) ABSTRACT

User interfaces and methods are disclosed. In some embodiments, a plurality of source artifacts is displayed. A selector is operable to indicate a selected set of the source artifacts. An output artifact is displayed having an output attribute that represents a combination of source attributes from the source artifacts in the selected set. An amount of contribution to the first output attribute by respective ones of the source artifacts in the first selected set is based on a coordinate of the selector relative to coordinates of the source attributes in the first selected set.

33 Claims, 12 Drawing Sheets

(51) Int. Cl.
  *G06F 3/04842* (2022.01)
  *G06F 3/04847* (2022.01)
  *G06T 11/40* (2006.01)

(56) References Cited

U.S. PATENT DOCUMENTS

| | | | |
|---|---|---|---|
| 11,010,421 B2 | 5/2021 | Yada et al. | |
| 2014/0306999 A1 | 10/2014 | Yim et al. | |
| 2017/0230675 A1 | 8/2017 | Wierstra et al. | |
| 2019/0362186 A1* | 11/2019 | Irshad | G08G 5/0026 |
| 2020/0226724 A1 | 7/2020 | Fang et al. | |
| 2020/0242771 A1 | 7/2020 | Park et al. | |
| 2020/0265219 A1 | 8/2020 | Liu et al. | |
| 2020/0320341 A1 | 10/2020 | Khurana et al. | |
| 2020/0342646 A1 | 10/2020 | Wang et al. | |
| 2021/0209464 A1 | 7/2021 | Bala et al. | |
| 2021/0358177 A1 | 11/2021 | Park et al. | |
| 2022/0028139 A1 | 1/2022 | Mitra et al. | |
| 2022/0121839 A1 | 4/2022 | Tagra et al. | |
| 2022/0270310 A1* | 8/2022 | Kumar | G06N 3/088 |
| 2022/0277431 A1 | 9/2022 | Tensmeyer et al. | |
| 2022/0398004 A1 | 12/2022 | Hellsten et al. | |

OTHER PUBLICATIONS

"This Website Turns My OC's Into Realistic Portraits" (Screenshots of a video in YouTube) https://www.youtube.com/watch?v=YhGOLOJZzIM published on Dec. 26, 2020.

Sharma, "11 Mind Blowing Applications of Generative Adversarial Networks (GANs)" https://machinelearningknowledge.ai/mind-blowing-applications-of-generative-adversarial-networks-gans/ published on Aug. 21, 2020.

"HyperStyle: StyleGAN Inversion with HyperNetworks for Real Image Editing" https://yuval-alaluf.github.io/hyperstyle/ published in 2022.

Karras, et al., "A Style-Based Generator Architecture for Generative Adversarial Networks," arXiv:1812.04948v3 (arXiv.org, Mar. 29, 2019).

Karras, et al., "Analyzing and Improving the Image Quality of StyleGAN," arXiv:1912.04958v2 (arXiv.org, Mar. 23, 2020).

Laine, "Feature-Based Metrics for Exploring the Latent Space of Generative Models," (ICLR 2018 Workshop Submission, OpenReview.net, Feb. 12, 2018 and Jun. 4, 2018).

Creswell, et al., "Generative Adversarial Networks: An Overview," arXiv:1710.07035v1 (arXiv.org, Oct. 19, 2017).

Tiu, "Understanding Latent Space in Machine Learning" (towardsdatascience.com, Feb. 4, 2020).

Das, "6 GAN Architectures You Really Should Know" (neptune.ai, Feb. 15, 2021).

"Artbreeder Screen Capture 1" (screens captured Jun. 9, 2021 from artbreeder.com).

"Artbreeder Screen Capture 2" (screen captured Jun. 9, 2021 from artbreeder.com).

Fujii, "From GAN Basic to StyleGAN2" (medium.com, Dec. 22, 2019).

Brownlee, "A Gentle Introduction to StyleGAN the Generative Adversarial Network" (machinelearningmastery.com, Aug. 19, 2019 and May 10, 2020).

Goodfellow, et al., "Generative Adversarial Nets," arXiv:1406.2661v1 (arXiv.org, Jun. 10, 2014).

Brownlee, "How to Explore the GAN Latent Space When Generating Faces" (machinelearningmastery.com, Jul. 3, 2019 and Sep. 1, 2020).

NVIDIA Developer, "Synthesizing High-Resolution-Images-with-StyleGAN2," transcribed from https://www.youtube.com/watch?v=9QuDh3W3IOY (youtube.com, Jun. 14, 2020).

Karras, "A Style-Based Generator Architecture for Generative Adversarial Networks," transcribed from https://www.youtube.com/watch?v=kSLJriaOumA (youtube.com, Mar. 3, 2019).

Search Report in GB2206274.9 dated Nov. 22, 2022, p pages.

* cited by examiner

USER INTERFACES AND METHODS FOR GENERATING A NEW ARTIFACT BASED ON EXISTING ARTIFACTS

CROSS-REFERENCE TO RELATED APPLICATIONS

This application is a continuation of U.S. Non-Provisional application Ser. No. 17/343,995, filed Jun. 10, 2021, the contents of which are hereby incorporated as if entirely set forth herein.

BACKGROUND

The word "artifact" refers essentially to any object that has been made by a human whether manually or with the use of tools. In this sense the word artifact can refer to any of a vast variety of items such as images, musical works, buildings, machines, sculptures, textual works, motion pictures, computer code, and more. The ability to create new such artifacts is often highly valued, especially in fields where doing so has traditionally required significant talent, training, labor or creativity. For this and other reasons, humans have developed tools and techniques to aid themselves in the creation of new artifacts.

One such tool is the modern computer, and one such technique is the use of application software running on a computer to create new artifacts based on one or more existing artifacts. By way of example, computer-aided design ("CAD") software enables a human user to manually manipulate existing templates to create drawings of new structures. Word processing software enables a user to modify or merge existing documents. Video editing software enables a user to modify or merge existing video segments. More recently, application software has emerged that enables users to generate new digital images based on existing digital images. These solutions and others, however, have proved to be somewhat limited in their capabilities and in their applicability. In addition, many of them exhibit shortcomings from a human-computer interaction point of view.

DETAILED DESCRIPTION

Figure 1:
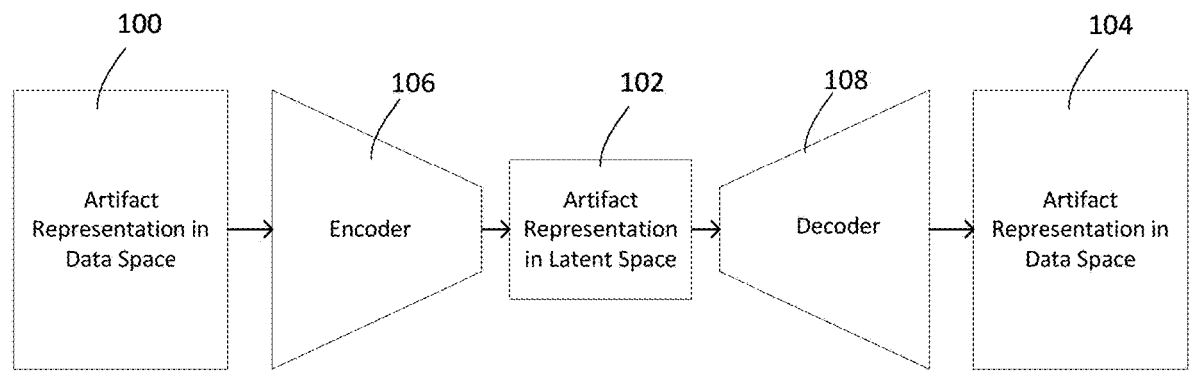
FIG. 1 is a block diagram illustrating an autoencoder and an example latent space.

The background section above generally described several examples of the technique of using application software running on a computer to create new artifacts based on one or more existing artifacts. A present day image-based example of this technique is a known website that enables the use of existing digital images to create new ones. This website allows a human user, using a web browser and a mouse, to choose a small number of source images from a larger set of existing images for the purpose of generating a new image. Using the application software provided by the website, the process of selecting source images consists of selecting images one at a time from a gallery such that the selected images appear in a separate browser area distinct from the gallery. The software presents a linear slider next to each of the selected source images. The user is then expected to move the sliders associated with each of the selected source images in order to separately indicate some desired level of contribution from each source image to what ultimately will become the newly-generated image. After moving the sliders, the user then must click a button in the web browser to indicate that the new image should be generated. After this button is clicked, and after some wait time has elapsed, a new image is presented in the browser. The new image purports to be based in some way on the selected source images and on the positions of the sliders that are associated with the source images.

While the above-described application software generally functions for its stated purpose, both the results that it achieves and the user interface that it provides for achieving them exhibit numerous shortcomings. One shortcoming is that the process for selecting the source images and for indicating their level of contribution to the generated image is awkward, since the images must be selected one at a time, and since separate sliders must be adjusted for each of the selected images. Another shortcoming is that no image is generated until after the user has clicked a browser button to indicate that a new image should be generated. The user thus lacks feedback during the selection process. In addition, because the described selection/generation process is iterative, the user must begin again after every unsatisfactory image has been generated. The selection/generation process thus lacks fluidity. Still another shortcoming is that it is often unclear, based on observation of the newly generated image, in what way each of the slider positions has contributed to the image and to what degree. Yet another shortcoming is that the entire selection/generation process is limited to only one type of artifact—that is, the process is limited solely to images.

These and other shortcomings of previous solutions may be beneficially addressed with techniques to be described herein.

Nomenclature

This disclosure describes multiple embodiments by way of example and illustration. It is intended that characteristics and features of all described embodiments may be combined in any manner consistent with the teachings, suggestions and objectives contained herein. Thus, phrases such as "in an embodiment," "in one embodiment," and the like, when used to describe embodiments in a particular context, are not intended to limit the described characteristics or features only to the embodiments appearing in that context.

The phrases "based on" or "based at least in part on" refer to one or more inputs that can be used directly or indirectly in making some determination or in performing some computation. Use of those phrases herein is not intended to foreclose using additional or other inputs in making the described determination or in performing the described computation. Rather, determinations or computations so described may be based either solely on the referenced inputs or on those inputs as well as others.

The phrases "configured to," "operable to" and the like as used herein mean that the referenced item, when operated, can perform the described function. In this sense an item can be "configured to" perform a function or can be "operable to" perform a function even when the item is not operating and is therefore not currently performing the function. Use of the phrases "configured to," "operable to" and the like herein does not necessarily mean that the described item has been modified in some way relative to a previous state.

"Coupled" as used herein refers to a connection between items. Such a connection can be direct or can be indirect through connections with other intermediate items.

Terms used herein such as "including," "comprising," and their variants, mean "including but not limited to."

Articles of speech such as "a," "an," and "the" as used herein are intended to serve as singular as well as plural references except where the context clearly indicates otherwise.

The words "display," "displaying," "displayed" and their variants as used herein mean and include any of a variety of activities related to the visual representation of an item. For example, "displaying" an item may be accomplished by displaying the item on one or more display devices or may be accomplished by printing a visual representation of the item. "Displaying" an item may also be accomplished by generating commands that can cause the item to be displayed on one or more display devices and/or generating data that can be displayed on one or more display devices, or both, regardless of whether the item is actually displayed on a display device. Commands that can cause an item to be displayed may comprise, for example, commands directed to a graphics subsystem of a host computer. Data that can be displayed may comprise, for example, a bit map or similar representation of a rendered image. In any embodiments, such commands or data may be stored on a suitable computer-readable medium, or they may be sent over one or more communication paths within a host computer (e.g. a graphics bus), or they may be sent over a network to one or more other host computers using appropriate network protocols, or all of these. In any embodiments, the display of an item may occur on one or more local display devices, or the display may occur on one or more remotely located display devices, or both. In embodiments that involve one or more computing devices, the display of an item may or may not occur in association with the same computing device that generates commands or data that cause the display. For example, a user interface element may be displayed in association with a local computing device such as in a web browser, and commands or data that cause the display of the same or a different user interface element may be generated by a remotely located computing device such as a web server and sent to the local computing device over a network.

Generative Neural Networks

The phrase "generative neural network" refers to a class of neural networks in the field of machine learning. A generative neural network ("GNN") is a type of neural network that has been trained to generate an artifact in response to a numerical input. Although a numerical input to a GNN may be random or may include randomly introduced elements, a characteristic feature of a trained GNN is that the artifacts that it generates in response to such an input will resemble other artifacts that constitute points in a probability distribution that the GNN was trained to emulate. For example, a large training set of digital landscape images may represent points in a probability distribution of images whose features correspond to landscapes. After a GNN has been trained on the set of landscape images, a random or semi-random input may be applied to the GNN. In response to the input, the GNN will generate an image that resembles a landscape—even though the generated image may differ in various ways from each of the images that were included in the training set.

Numerous techniques exist for training a GNN. One such technique is to use what is known as a generative adversarial network ("GAN"). The GAN concept is to train two neural networks in tandem while essentially placing one of the networks in competition with the other. During training, one of the two networks (the "discriminator" or "D") learns to classify inputs as belonging to one of two categories: those that belong to a set of authentic examples (e.g., the training set), and those that do not. Meanwhile the other network (the "generator" or "G") attempts to learn the probability distribution of the authentic examples through its interactions with the discriminator. It does so during a process in which it generates synthetic examples based on noise inputs and presents the synthetic examples to the discriminator for classification.

In this process, which is explained more fully, for example, in Goodfellow, et al., "Generative Adversarial Nets," arXiv:1406.2661v1 [stat.ML] (2014), and in Creswell, et al., "Generative Adversarial Networks: An Overview," arXiv:1710.07035v1 [cs.CV] (2017), a cost function is employed to optimize both the generator and the discriminator. For example, the training process may seek to optimize both G and D by solving for $$\max_D \min_G V(G,D) \tag{1}$$

given a cost function such as $$V(G,D) = E_{P_{data}(x)} \log D(x) + E_{P_{g}(x)} \log(1-D(x)) \tag{2}$$

and numerous examples x, where $E_{P_{data}(x)} \log D(x)$ is the expected value of log D(x) for examples x taken from the set of authentic examples, $E_{Pg(x)} \log(1-D(x))$ is the expected value of $\log(1-D(x))$ for synthetic examples x taken from the output of the generator, and D(x) is the probability that a given example x came from the set of authentic examples rather than from the generator. With such a cost function applied during training, the generator becomes optimal when $p_{g(x)}$=pdata(x). In other words, the generator becomes optimal when the probability density function corresponding to synthetic examples is the same as the probability density function corresponding to the authentic examples, signifying that the generator has successfully learned the probability density function of the training set. After this occurs, the probability produced by the discriminator will be 0.5 for all examples x regardless of the set from which the examples are drawn.

Once so trained, the generator may be used independently of the discriminator to generate further synthetic examples, each of which will resemble examples from the training set. Such a generator is an example of a GNN as that term is used herein.

Latent Spaces and GNNs

Each numerical input that can be directly applied to a GNN to generate a synthetic artifact represents a discrete point in a usually multidimensional space commonly known as a "latent space." This space is called latent because it is, in a sense, hidden from view. The block diagram shown in FIG. 1 helps to illustrate this.

FIG. 1 is a schematic illustration of an autoencoder. An autoencoder is a machine that is capable of translating an artifact from a first representation (data space representation 100) to a second, intermediate representation (latent space representation 102), and then from the intermediate representation to a third representation (data space representation 104). The root word "auto" in the name of this machine refers to the fact that the third representation is identical to the first representation. To accomplish this result, an autoencoder uses an encoder 106 to translate an artifact from data space to latent space. It then uses a decoder 108 to translate from latent space back to data space.

For the sake of explanation, consider a case in which the artifacts in data space correspond to digital images. In such a case, artifact representations 100 and 104 may each correspond, again for example, to a 2D digital image that could be displayed on a computer monitor or other display device and viewed by a human. Assume further that each of the images comprises 1024×1024 pixels. It could be said, then, that each point in the data space for this example has dimensions 1024×1024. The data space itself in this example would correspond to the space of all possible points having dimensions 1024×1024. Assume further that latent representation 102 has dimensions 1×512 (in machine learning applications, a latent space typically has smaller dimensionality than does a corresponding data space). The latent space in such an example would correspond to the space of all possible points having dimensions 1×512. Stated differently, the latent space would correspond to all possible vectors having length 512. The function of the encoder in examples such as this one can be viewed as that of data compression, since the encoder maps a given data space value appearing at its input to a latent space value having smaller dimensionality than the data space value. Similarly, the function of the decoder can be viewed as that of data decompression, since the decoder maps a given latent space value appearing at its input to a data space value having larger dimensionality than the latent space value.

While an autoencoder and a GAN are not necessarily identical machines, their commonalities are instructive for the purpose of understanding the relationship between a latent space and a GNN that has been trained using a GAN process: The generator in a GAN is analogous to a decoder, since it takes a latent space representation as an input and generates a corresponding data space representation as an output. Thus, a GNN is also analogous to a decoder; it may be implemented using the generator from a GAN.

Exploring Latent Spaces

One interesting aspect of a latent space is that, because the information in a latent space is compressed in the manner described above, representations of similar artifacts should be closer together in the latent space than they are in the data space. This follows from the manner in which the dimensionality of the data is reduced during its translation from data space to latent space—"extraneous" information that makes each artifact distinct in the data space (e.g. the color of a chair or the fabric with which it is covered) can effectively be removed in the latent space representation such that only the more characteristic features of the artifact remain (e.g. the general structure of a chair-like object). If the objective is to create new artifacts from existing ones, then, it can be of interest to identify the locations of the existing artifacts in the latent space and to explore other points in the latent space between them.

Doing so, however, has proved not to be straightforward. One of the reasons for this is that a typical latent space cannot be directly visualized. For example, while a 2D or a 3D object can be directly observed, dimensions beyond three cannot be directly observed. Colors or intensity values may be used to represent one or even two dimensions beyond three in some visualization methods, but such approaches quickly become impractical as the dimensionality of the latent space increases.

Example User Interfaces

The inventors hereof have discovered novel user interfaces, methods, and structures to be described below that may be used both for intuitively and fluidly creating new artifacts from existing artifacts and for exploring latent spaces in a visual manner.

Selection and Output

Figure 2:
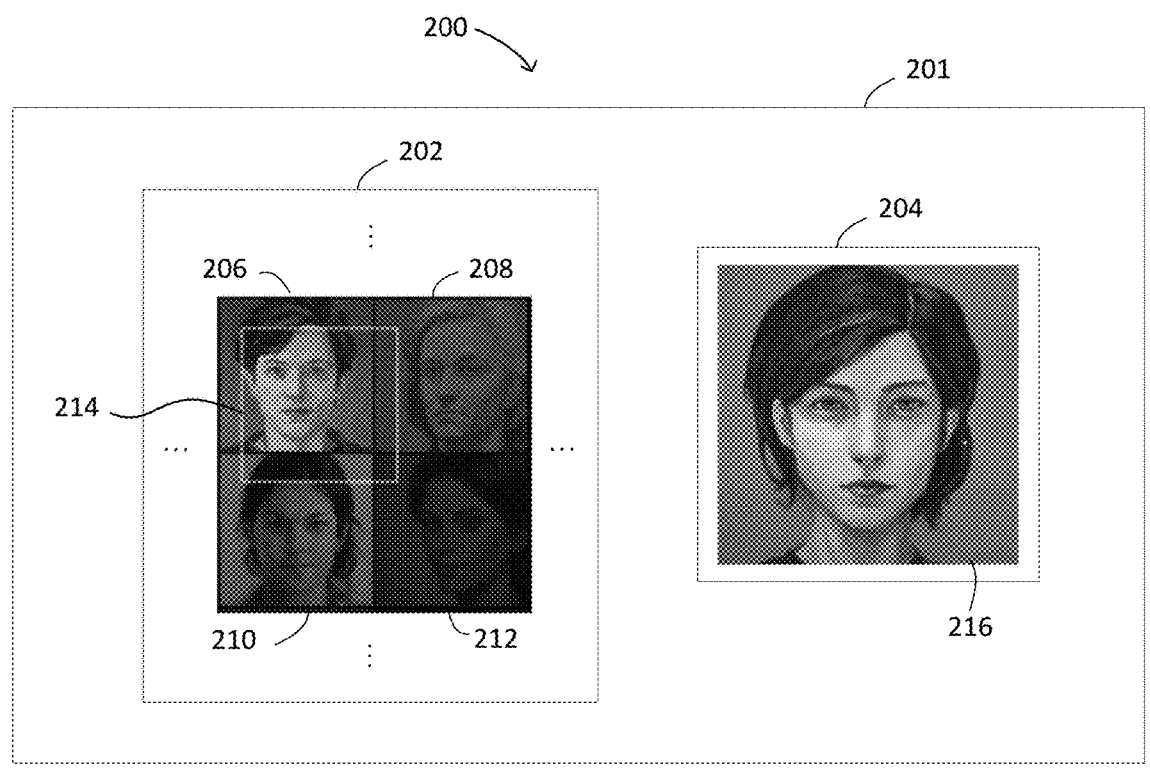
FIG. 2 is a block diagram illustrating an example category of user interfaces in accordance with embodiments.

Referring now to FIG. 2, a first example user interface 200 is shown being displayed on a display device 201. Two regions 202, 204 are displayed within the interface. Source region 202 provides a space for displaying a plurality of source artifacts, while output region 204 provides a space for displaying an output artifact.

In the illustration, the source region is shown displaying four source artifacts 206-212. In actual embodiments many more than four source artifacts may be displayed in the source region, as indicated by the ellipses in the drawing. While each of the source artifacts shown in the example comprises an image—specifically, an image of a human face—images are used here only for purposes of illustration. In general, the source artifacts displayed may comprise any type of artifact or representation thereof including, without limitation, representations of video segments, audio segments, textual works, musical works, computer code, and more. Moreover, in embodiments that do display image artifacts, the images displayed need not be limited to images of human faces as in this example but may comprise images with any type of content including, without limitation, landscapes, structures, animals, plants, photographs, and more. In general, the displayed source artifacts need not be all of the same type but may instead comprise a mix of different artifact types in other embodiments.

The source artifacts may be displayed in any suitable arrangement. One such arrangement is a grid pattern such as the one shown here, comprising rows and columns of source artifacts. In other embodiments, the source artifacts may be displayed in other arrangements, or in free-form or irregular patterns, and the source artifacts may have regular or irregular void spaces between them. In addition, each of the displayed source artifacts may have any shape or size, and their shapes and sizes need not all be the same.

A selector 214 is also shown being displayed within source region 202. In the illustrated embodiment, the selector takes the form of a white square having similar dimensions and having a similar shape as has each of the displayed source images. In other embodiments, the selector may have any shape and size, and the shape and size of the selector may differ from the shapes and sizes of the source artifacts. For example, the selector may comprise any type of bounding perimeter including, without limitation, a free-form shape, a circle, an ellipse, or a polygon such as a rectangle or a square as in the illustrated example. In other embodiments, the selector may correspond to a single point, such as a cursor position, or may correspond to a single point within a larger selector shape. In still further embodiments, any of the user interface elements including the selector may be three dimensional. For example, the selector and/or any of the source artifacts may be holographic. In the illustrated embodiment, the selector is operable to be moved within source region 202 to indicate a selection region. The selector may be moved in any suitable manner. For example, a user may move the selector with an input device such as a computer mouse or with a gesture on a touch screen or a touch pad.

Output region 204 is shown displaying an output artifact 216. Like the source artifacts, the output artifact may comprise any kind of artifact or representation thereof, including three-dimensional and/or holographic representations. In the example shown, the output artifact is an image. The output artifact includes at least one selected output attribute that represents a combination of attributes from selected ones of the source artifacts. In the example of FIG. 2, the selected output attribute comprises a content element—in this case, specifically the facial features, hair style, pose and gender of the subject of a portrait. As can be seen from the drawing, the content element of the output artifact represents a combination of corresponding content attributes exhibited by those source artifacts in region 202 that intersect with selector 214. In some embodiments, each source artifact may be associated with a respective display region. For example, the pixels of display 201 that are used to display a given source artifact or representation thereof may define the display region for that source artifact, or the display region containing a source artifact representation may have a different size or shape than does the source artifact representation that it contains. Like the source artifacts themselves, such source artifact display regions may all have the same size and shape or may differ in size or shape. For example, source artifact display regions may comprise any mixture or free form shapes, circular or elliptical shapes, or polygonal shapes such as rectangles or squares. Other examples are also possible. The phrase "source artifact" as used herein may be construed interchangeably as a reference either to a source artifact or to its corresponding source artifact display region.

In any such embodiments, the selected ones of the source artifacts may correspond to those source artifacts whose display regions intersect with the selection region, and the selection region at a given moment of time may correspond to an area defined by the selector at that moment. As the selector is moved, the selection region changes, and the corresponding selected ones of the source artifacts may change along with it.

The output element may correspond to any of the attributes exhibited by the source artifacts. For example, in some embodiments, the output element may comprise a style element rather than a content element. In embodiments such as the one illustrated in FIG. 2, in which the source artifacts and the output artifact are images, a style element may correspond for example to the background color and lighting of a portrait, to the type of media in which the portrait is painted (e.g. pastels, oil), or to the brush stroke characteristics of a painter (e.g., Monet, van Gogh or Renoir brush stroke characteristics). Other examples are possible and may vary depending on the types of source artifacts employed. In these embodiments, moving the selector among the source artifacts causes the style in which the output artifact is rendered to correspond to a combination of the styles in which the selected ones of the source artifacts are rendered. As this occurs, the content elements of the output artifact may remain substantially unchanged.

Weighting Techniques

In some embodiments, the combination of source attributes that are reflected by an output attribute may comprise a weighted combination of source attributes. In such embodiments, an amount of contribution to the weighted combination by a given one of the source artifacts may be determined using a variety of techniques to be further described below. Such techniques may vary based, for example, on the shape and size of the selector, and on the shape, size and arrangement of the source artifacts and/or display regions that correspond to the source artifacts.

Figure 3:
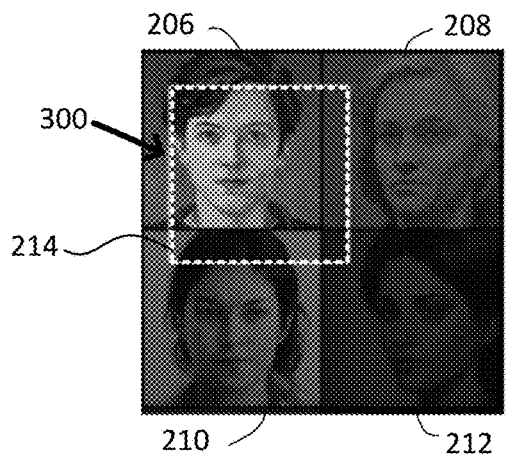
FIGS. 3-9 are block diagrams illustrating components of an example selection region within a user interface in accordance with embodiments.
Figure 4:
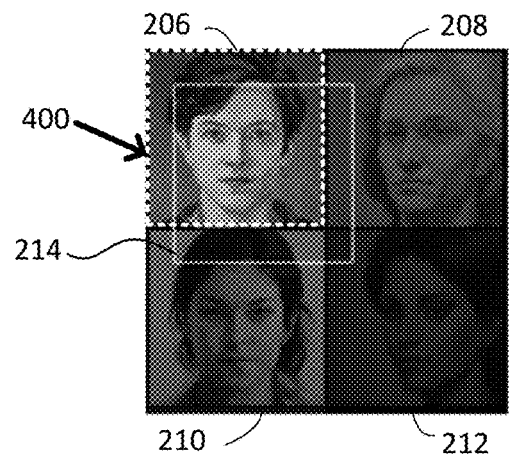
Figure 5:
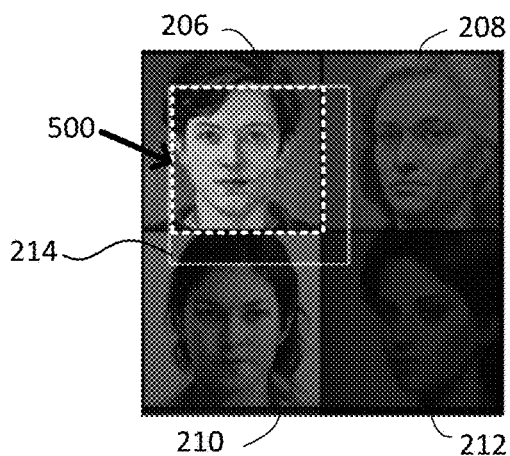
Figure 6:
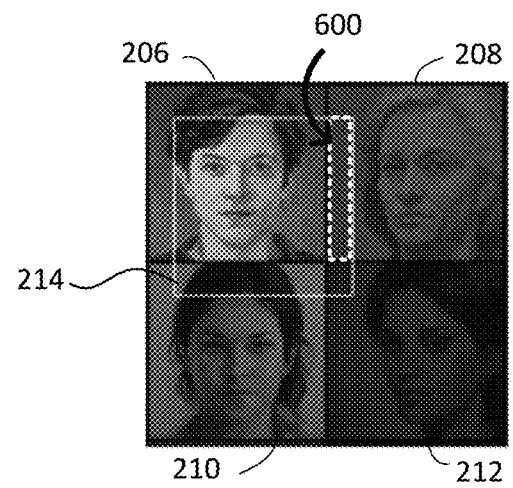
Figure 7:
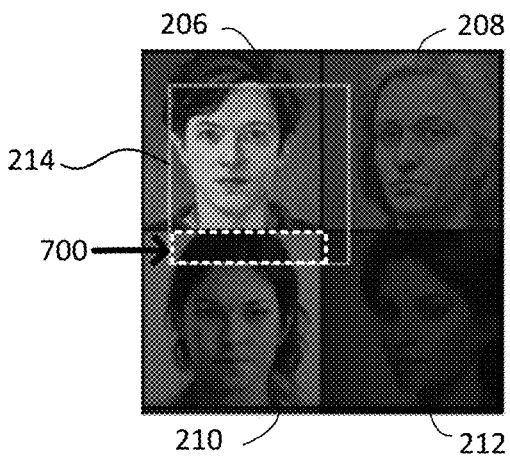
Figure 8:
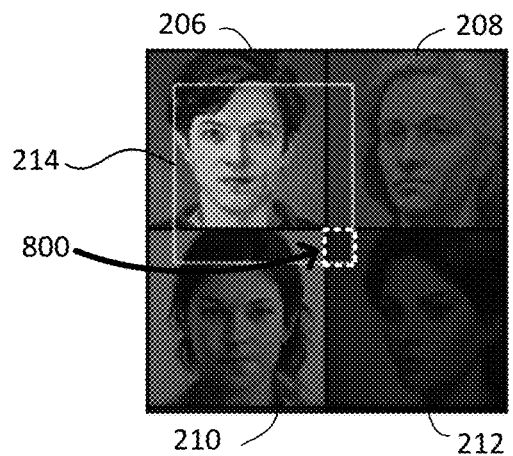

FIGS. 3-9 provide an illustrative example of a weighting technique that is based on areas. As shown in FIG. 3, the position of selector 214 defines a selection region. The selection region is indicated in the drawing using white dashed line segments. The selection region defines a first area 300 inside the boundaries of the selector. As shown in FIG. 4, the display region that corresponds to source artifact 206 defines a second area 400. The intersection of areas 300 and 400 defines a third area 500, as shown in FIG. 5. In general, this third area may correspond for example to a total area of intersection between any source artifact (or its display region) and the selection region that is indicated by the selector's position. Thus, the area of intersection between the selection region and artifact 208 defines an area 600 (see FIG. 6). Similarly, the area of intersection between the selection region and artifact 210 defines an area 700 (see FIG. 7), and the area of intersection between the selection region and artifact 212 defines an area 800 (see FIG. 8).

Depending on the sizes, shapes and arrangements of the source artifacts or their respective display regions, and depending also on the size and shape of the selector, the sum of areas 500, 600, 700, 800 may or may not equal the area of the selection region. For example, the selection region may also contain void spaces in between displayed source artifacts. In the embodiment illustrated by FIGS. 3-8, the sum of areas 500, 600, 700, 800 does equal the area of the selection region because the shapes, sizes and arrangements of the source artifacts makes them contiguous within the selection region.

Figure 9:
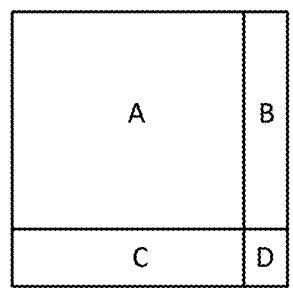

Referring now to FIG. 9, assume for the sake of explanation that area A in FIG. 9 corresponds to area 500 and that areas B, C and D in FIG. 9 correspond to areas 600, 700 and 800, respectively. In one class of embodiments, a percentage contribution of a source attribute from artifact 206 to an output attribute may correspond to the quotient A/(A+B+

C+D). Similarly, a percentage contribution from artifact 208 to the output attribute may correspond to the quotient B/(A+B+C+D). In like manner, the percentage contribution of artifact 210 may correspond to the quotient C/(A+B+C+D), and the percentage contribution of artifact 212 may correspond to the quotient D/(A+B+C+D). Such a weighting technique may be employed regardless of whether the sum of areas A, B, C, D equals the area of the selection region. For example, in embodiments that may include void spaces between displayed source attributes, the quotients may be normalized to compensate for any void space included in a given selection region.

Numerous other weighting techniques based on areas are also possible. For example, the amount of contribution by a given source artifact to any output attribute may be based on a ratio between the artifact's intersection with the selection region (e.g., area A, B, C or D) and the total area defined by the selection region. In still other embodiments, the contribution by a source artifact may be based on a ratio between the artifact's intersection with the selection region (e.g., area A, B, C or D) and a total area defined by the artifact's display region (e.g., the size of the displayed source artifact).

Another variety of weighting techniques may be based on interpolation. For instance, in embodiments that display source artifacts in a regular pattern such as a grid pattern of rows and columns, or such as a hexagonal grid pattern, contributions from selected source artifacts to an output attribute may be determined based on the display coordinates of a selector relative to display coordinates of the source artifacts.

As an illustrative example of the latter technique, consider a selected set of four source artifacts $SA_{i,j}$, $SA_{i,j+1}$, $SA_{i+1,j}$, and $SA_{i+1,j+1}$, arranged in a rectangular grid pattern having a total extent $size_x$ in the horizontal direction and a total extent $size_y$ in the vertical direction. Given a selector positioned within the grid, any point on the selector may be chosen to indicate an interpolation coordinate within the grid. For convenience of explanation, assume a rectangular selector shape positioned within the grid, and assume that the coordinates $(t_x, t_y)$ of the upper left corner of the selector shape are chosen to designate the interpolation coordinate. Also for convenience, assume a normalization using $size_x$ and $size_y$ such that $t_x$ and $t_y$ each fall within the range [0, 1]. In such an example, the contributions of each of the selected source artifacts SA to an output artifact OA may be determined using bilinear interpolation as follows:

$$OA = (SA_{i,j}(1-t_x) + SA_{i,j+1}t_x)(1-t_y) + (SA_{i+1,j}(1-t_x) + SA_{i+1,j+1}t_x)t_y$$

Interpolation methods other than bilinear interpolation may also be employed in various embodiments, as appropriate.

Any suitable combination of these or other techniques may be employed to determine a weighted contribution by a source artifact to an output attribute, depending on the desired application.

Continuous or Discrete Updating

In some embodiments, the appearance of the output artifact may change continuously as the selector is moved among the source artifacts to cause corresponding changes in the selection of source artifacts or in the weights of their respective contributions. Such embodiments enable a user to explore a latent space associated with the source artifacts in a fluid manner. In other embodiments, it may be desirable to fix the appearance of the output artifact until a "generate" or an "update" command or the like is issued, e.g. by clicking a corresponding button provided in the user interface. In the latter class of embodiments, changes to the output artifact may occur at selected discrete times. In still further embodiments, a mode selector may be provided in the user interface such that a user may choose whether the output artifact should change continuously with movement of the selector, or whether it should change only at discrete times in response to a generate or an update command. In any of these embodiments, the user is able to explore a latent space associated with source artifacts in a visual and intuitive manner—visual because the observable output artifacts correspond to points in the latent space that may lie between points that are represented by each of the source artifacts, and intuitive because of the manner in which the user is able to indicate desired selections and weighting among the source artifacts.

Selection From Among Multiple Types of Source Attributes

Figure 10:
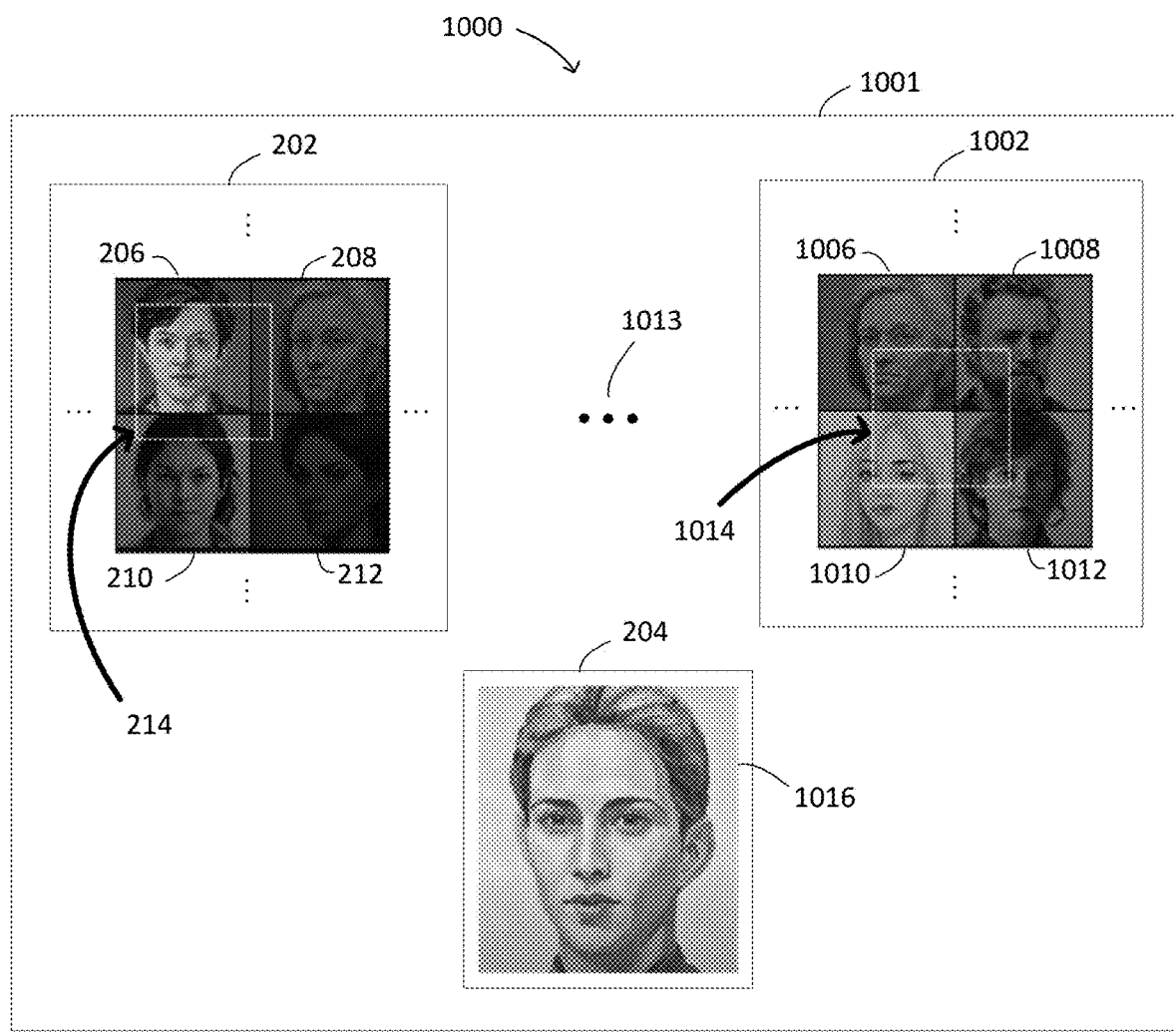
FIG. 10 is a block diagram illustrating a further example category of user interfaces in accordance with embodiments.

As was mentioned above, source artifacts may exhibit more than one type of source attribute from which a user may want to select for representation in an output artifact. For example, it was mentioned that one such source attribute may comprise a content element, while another such source attribute may comprise a style in which the content element or the overall image is rendered. (Several examples of possible content elements and style elements are describe above.) FIG. 10 generically illustrates an example class of user interfaces in which more than one attribute of an output artifact may be influenced independently by selecting from among different types of source attributes in the source artifacts.

Referring now to FIG. 10, user interface 1000 is shown being displayed on a display device 1001. Like user interface 200, user interface 1000 includes a source region 202, which provides a space for displaying multiple source artifacts such as images 206-212. Also like user interface 200, user interface 1000 includes an output region 204, which provides a space for displaying an output artifact such as image 1016. Unlike user interface 200, however, user interface 1000 includes one or more additional source regions such as source region 1002, which provide spaces for displaying additional source artifacts such as images 1006, 1008, 1010, 1012.

In this class of embodiments, each source region may correspond to a different type of source attribute. For example, source region 202 may correspond to a content attribute, while source region 1002 may correspond to a style attribute. In one sense, each source region in such embodiments may be thought of as a palette. In accordance with this analogy, source region 202 may serve as a palette from which content elements may be selected, while source region 1002 may serve as a palette from which style elements may be selected. As indicated at 1013, arbitrarily many source regions may be displayed in such embodiments, each of them displaying multiple source artifacts, and each of them corresponding to a different source attribute type.

In the embodiment shown, each of the source regions includes its own selector 214, 1014. As a selector is moved within its respective source region, selected ones of the source artifacts are identified in a similar manner to that described above with respect to selector 214, and potentially with an associated weight. In turn, output artifact 1016 comprises multiple output attributes, each of which is independently influenced by selections indicated in the various source regions. Thus, as selector 214 is moved within source region 202, a content element of the output image may change, but a style element of the output image may remain substantially unchanged. Similarly, as selector 1014 is moved within source region 1002, a style element of the output image may change, but a content element of the image may remain substantially unchanged. As was describe above in relation to user interface 200, the output artifact may be updated continuously or discretely as the selectors are moved, potentially in accordance with a user's mode selection. In further embodiments, output artifacts may include animations, such as may be created by adding noise inputs at various layers of a GNN being used to generate the output artifact (to be further described below.)

In various embodiments, the number of selectors need not be the same as the number of distinct source regions displayed, and the number of source regions displayed may vary from one to arbitrarily many. For example, in some embodiments, a single source region may be displayed with multiple selectors therein, each of the selectors corresponding to a different attribute type. In such embodiments, one selector may be moved across the source artifacts to choose a style output element for the output artifact, while another selector may be moved across the same source artifacts to choose a content element for the output artifact. In further embodiments, a single selector may be used having multiple modes. In the latter embodiments, the user interface may enable a user to choose a mode for the selector such that, when a first selector mode is chosen, movements of the selector may indicate content choices (for example), and when a second selector mode is chosen, movements of the same selector may indicate style choices (again, for example). In still further embodiments, multiple distinct source regions may be displayed such that each source region corresponds to a separate source attribute type, while only a single selector may be provided. In such embodiments, a user may move the single selector within a first source region to make a content selection (for example) and, after fixing the content selection, move the same selector to another source region to make a style selection (again, for example). Other embodiments are also possible.

In embodiments that display source artifacts in multiple source regions, the sets of artifacts displayed in the various source regions may be the same, or they may be distinct. In still further embodiments, the sets may be entirely disjoint.

Movement of Source Artifacts

A mechanism may be provided in the user interface in any of the above embodiments, if desired, to allow a user to move source artifacts within a given source region or into another source region. In this manner, additional flexibility may be afforded for making source attribute selections. For example, a selector may be used to indicate a selection region after several suitably chosen source artifacts have been brought together in close enough proximity that the selection region can include them.

In still further embodiments, the selector may comprise a cursor rather than a bounding perimeter, and the selection region may be indicated by moving selected ones of the source artifacts such that the source artifacts overlap one another on the display, or overlap with a fixed-position selection region, or are contained within such a region. Multiple such fixed-position selection regions may be provided, each corresponding to a different attribute type. In such embodiments, the degree of overlap among the selected source artifacts may be used to determine a contribution that will be made to an output attribute by each of the selected source artifacts. The amount of each respective contribution may be determined in a manner similar to the techniques described above in relation to FIGS. 3-9.

Locations and Relative Positions of Displayed Elements

The locations and relative positions of the displayed elements illustrated herein are provided by way of example and not by way of limitation. In some embodiments, the locations or the relative positions of the source regions and the output region may differ from the illustrated embodiments or may be varied according to a user's selections (such as, for example, by displaying the elements within separate windows and allowing the user to rearrange and/or resize the windows). In other embodiments, some of the displayed elements may be omitted and others may be added. In still further embodiments, some of the displayed elements may be displayed in a first geographic location while the same or others of the displayed elements may be displayed in one or more remote geographic locations, enabling multiple users to collaborate in the generation of one or more output artifacts.

Processing Locations

Similarly, in any of the embodiments described herein, processing steps need not all be performed in a same physical location, and elements of processing hardware need not all be located in a same physical location. In some embodiments, for example, user interface elements may be displayed in one or more first locations, while output artifact generation or other processing steps may be performed in one or more second locations distinct from the first locations.

Example Methods and Structures

Figure 11:
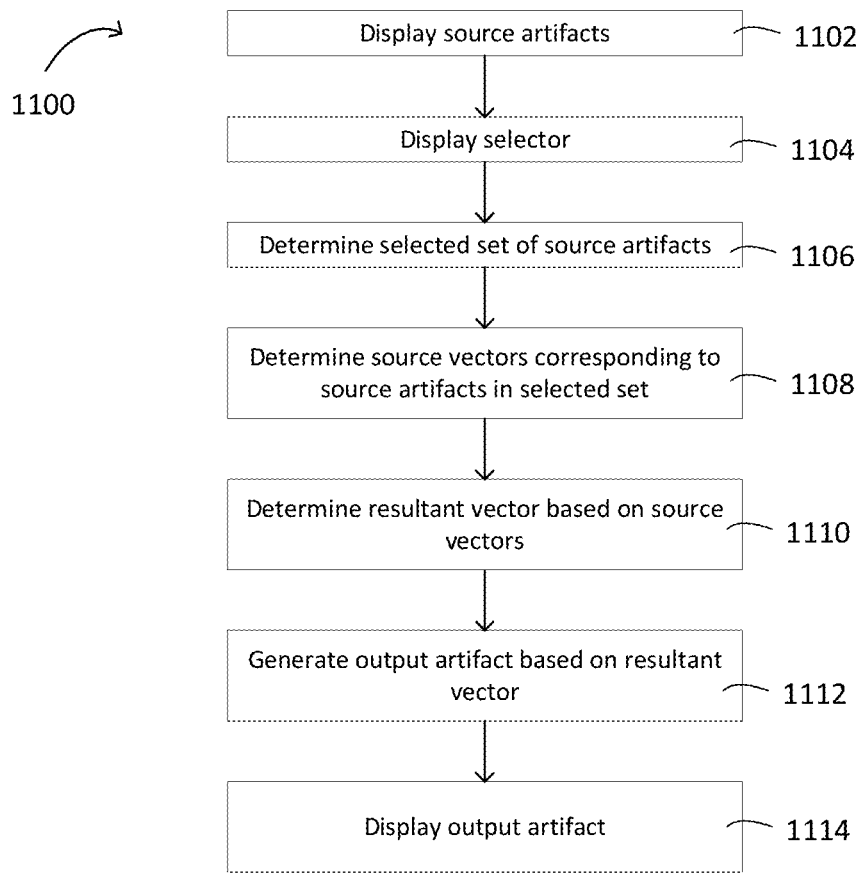
FIG. 11 is a flow diagram illustrating example methods in accordance with embodiments.

FIG. 11 illustrates an example class of methods 1100 for generating a new artifact based on existing artifacts, or for enabling a user to explore latent spaces in a visual manner in accordance with any of the above described user interfaces or others. In steps 1102 and 1104, respectively, at least one plurality of source artifacts is displayed, and at least one selector is displayed. The displaying may be performed, for example, in any manner consistent with the above described example user interfaces. In step 1106, a selected set of the displayed source artifacts is determined. The selected set may correspond to those source artifacts that have been indicated by a user using the selector in accordance with the above described examples. In steps 1108, 1110 and 1112, all which are to be further described below, source vectors are determined corresponding to the source artifacts in the selected set, one or more resultant vectors are determined based on the source vectors, and an output artifact is generated based on the one or more resultant vectors.

At step 1114, the output artifact may be displayed on one or more display devices. For example, the output artifact may be displayed in an output region corresponding to any of the example user interfaces described above, or other suitable actions may be taken in relation to the output artifact. In some embodiments, the output artifact need not be displayed but may instead be stored in a suitable computer-readable storage medium or printed. In still other embodiments, instructions or data may be generated in step 1114 that cause the output artifact to be displayed in a local or a remote location, or both. Such instructions may comprise, for example, commands directed to a graphics subsystem of a host computer, and such data may comprise, for example, a bit map or similar representation of a rendered image. The commands or data may be sent over one or more communication paths within a host computer (e.g. a graphics bus), or they may be sent over a network to one or more other host computers using an appropriate network protocol, or both. The latter types of embodiments may be appropriate for, among other things, enabling multiple disparately-located users to collaborate in the generation of output artifacts.

Any or all of the steps in method 1100 may be performed concurrently, or they may be performed sequentially.

Figure 12:
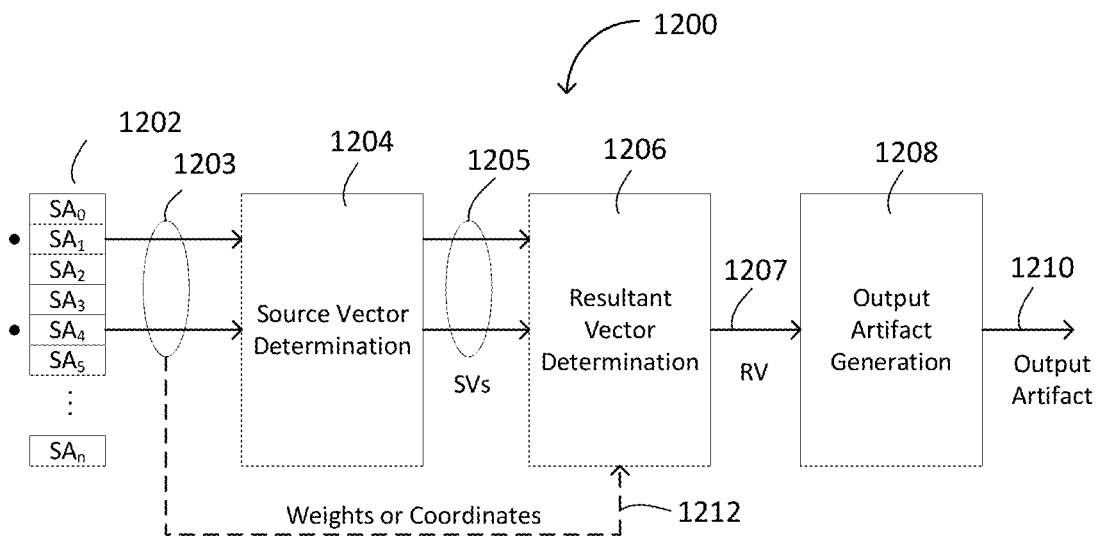
FIG. 12 is a block diagram schematically illustrating example structures, in accordance with embodiments, that may be used to implement the example methods.

FIG. 12 schematically illustrates example structures 1200 that may be used to perform methods in accordance with method 1100. Each of the blocks illustrated in FIG. 12 may be implemented by using appropriate software running on one or more computing devices or by using special purpose hardware designed to perform the indicated functions, or by using a combination of these. Data structures corresponding to the source artifacts being displayed are indicated at 1202. Any suitable data structures may be used to represent the source artifacts, and any suitable windowing system or graphics toolkit may be used to display the source artifacts along with the one or more selectors that a user may move to indicate selected sets of the displayed source artifacts. In some embodiments, image data or image files corresponding to each of the source artifacts, or pointers to such data or files, may be stored in data structures 1202 to facilitate the display of the source artifacts for selection. The same data structure or another data structure or technique may be used to identify those source artifacts that have been included in the selected set as a result of the operations described in relation to step 1106. For purposes of illustration, an example selected set of source artifacts is indicated in FIG. 12 by the black dots located next to source artifact 1 ("$SA_1$") and source artifact 4 ("$SA_4$").

Figure 13:
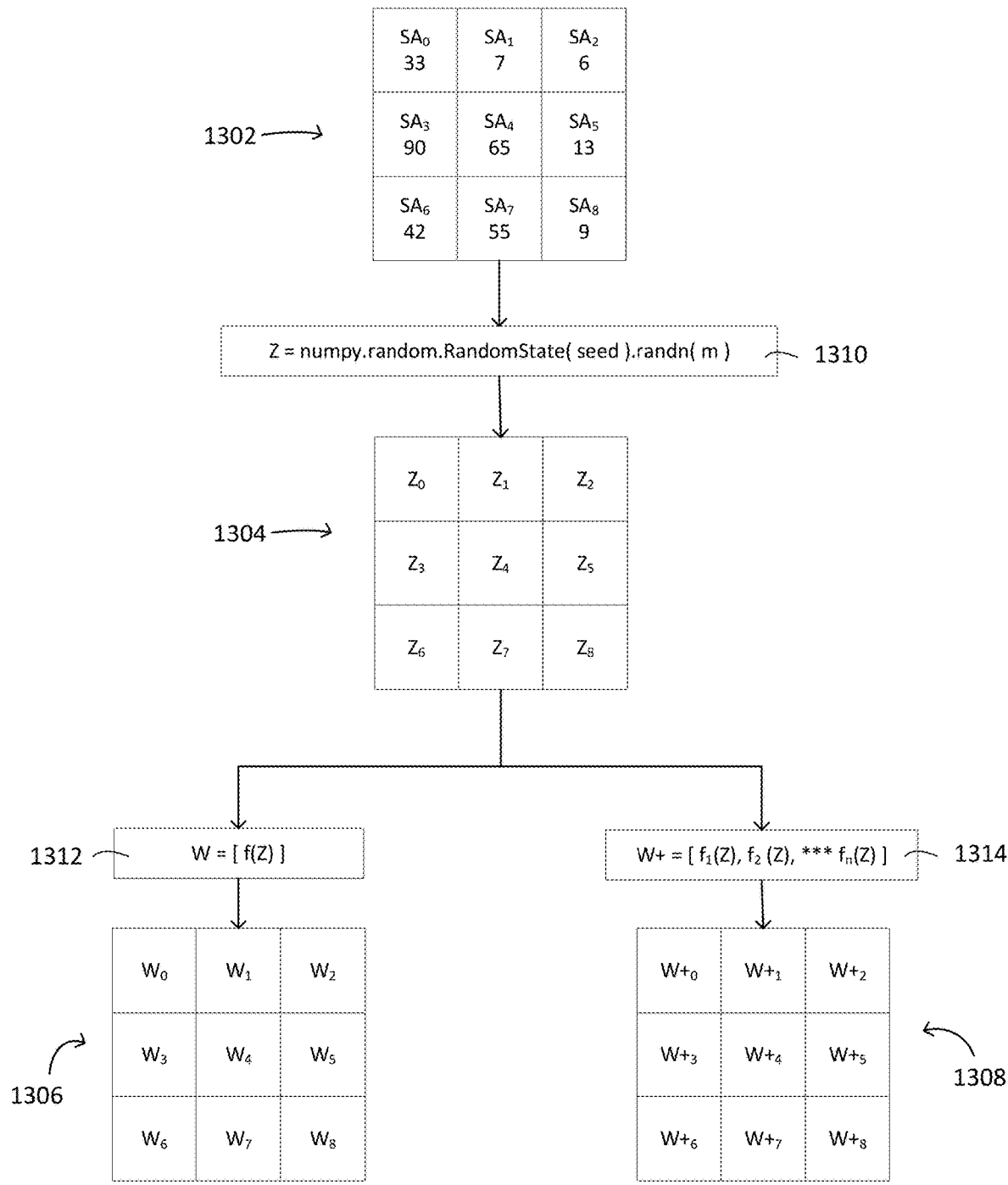
FIG. 13 is a block diagram illustrating numerous example modes of representation that may be employed in conjunction with embodiments.

Block 1204 may be provided to perform the function of determining one or more source vectors 1205 that correspond to the source artifacts in the selected set. To facilitate performing this function, block 1204 may be provided with access to data structures 1202 and to an appropriate indication 1203 regarding which of the source artifacts have been included in a given selected set. The function of block 1204 may be performed in a variety of ways, depending on which mode of representation is to be used in relation to the source artifacts. Several example modes of representation are illustrated in FIG. 13, any of which may be employed in embodiments. In other embodiments, other suitable modes may be used.

Referring now to FIG. 13, grids 1302, 1304, 1306 and 1308 each correspond to an example set of source artifacts $SA_0$-$SA_9$. The specific numbering of the source artifacts shown and the arrangement in which they are shown are only for purposes of illustration. In actual embodiments, many more source artifacts may be represented, and the source artifacts need not be arranged in the grid pattern shown in the drawing or numbered in the manner indicated. Each of the illustrated grids indicates a different mode in which source vectors corresponding to the displayed or the selected source artifacts may be represented internally within a given implementation. In various embodiments, any of such modes of representation may be employed either alone or in combination, or other suitable modes may be used.

Grid 1302 illustrates a first example mode of representation. In this mode, each of the source artifacts may be associated with a random integer. For example, source artifact $SA_0$ may be associated with the integer 33, source artifact $SA_1$ may be associated with the integer 7, source artifact $SA_4$ may be associated with the integer 65, and so on. In embodiments employing this mode or representation, the integers associated with each source artifact may be stored in a data structure, as generically indicated at 1202, such that the integers are made available for reference by block 1204 when needed.

Grid 1304 illustrates a second example mode of representation. In this mode, each of the source artifacts may be associated with a random vector, Z, that corresponds to a respective one of the random integers from grid 1304. For example, as indicated at 1310, the random vector Z for a given one of the source artifacts may be determined using a function that takes as inputs a "seed" value corresponding to the source artifact's random integer, and a dimension value "m" corresponding to the number of elements the random vector Z should contain. As a specific example for purposes of explanation, a random vector $Z_0$ associated with source artifact $SA_0$ may correspond to the value returned by calling a randn function provided by the NumPy library associated with the Python programming language (or another similar function provide by another library or computing environment) in a manner such as the following:

numpy.random.RandomState(seed=33).randn(512)

Such an implementation would be appropriate for embodiments in which it is desired to represent each source artifact with a vector that contains 512 elements, each of which is a floating point number. Similarly, a 512-element random vector $Z_8$ associated with source artifact $SA_8$ may correspond to the value returned by the call numpy.random.RandomState(seed=9).randn(512)

and so on. In such embodiments, each vector Z comprises a random vector because each corresponds to a random seed value—in the illustrated example, the random integer associated with a respective one of the source artifacts in grid 1302. In practice, the randn function and similar functions will return the same vector each time the function is called with the same seed value. For this reason, it is possible to store just one random integer in association with each source artifact and to compute the random vector Z for a given one of the source artifacts whenever the corresponding random vector is needed. It is also possible to store the random vectors Z in a data structure such as structure 1202 so that the vectors need only be computed once. Once computed, the vector may thereafter be made available for reference whenever needed.

Figure 14:
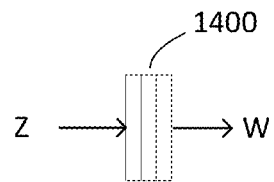
FIGS. 14-15 are block diagrams illustrating example techniques for implementing two of the modes of representation illustrated in FIG. 13.

Grid 1306 illustrates a third example mode of representation. In this mode, each of the source artifacts may be associated with an intermediate vector, W, that corresponds to the vector Z associated with the same artifact. For example, as indicated at 1312, each intermediate vector W may be determined using a function, f(Z), that maps a given vector from Z space to W space. In various embodiments, such a function may be implemented using a multilayer neural network 1400 as illustrated in FIG. 14. Neural network 1400 may be trained, for example, during the process of training a GAN as described above. In embodiments using this mode of representation, the intermediate vector W corresponding to each source artifact may be computed when needed or may be computed once and stored for later retrieval, also as described above.

Figure 15:
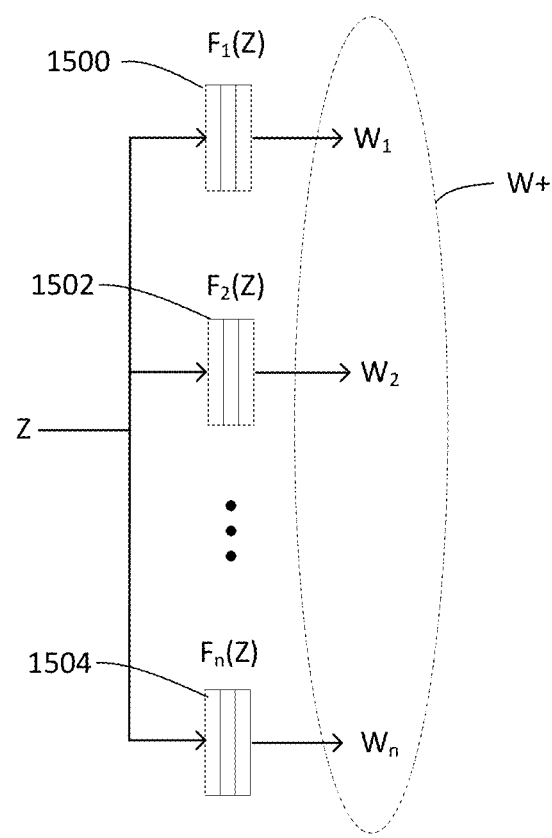

Grid 1308 illustrates a fourth example mode of representation. In this mode, each of the source artifacts may be associated with a set W+ of intermediate vectors instead of with a single intermediate vector W. In the general case, and in some corresponding embodiments, each vector in a set W+ may be determined using a different function f(Z) that maps the Z value for the corresponding source artifact from Z space to a point in W space. Thus, for embodiments in which each set W+ contains n vectors, n such functions $f_1(Z)$ to $f_n(Z)$ may be provided to determine the vectors for a given artifact, as indicated at 1314. Each of the mapping functions may be implemented by a different multilayer neural network 1500, 1502 . . . 1504, as indicated in FIG. 15. Like neural network 1400, each of neural networks 1500, 1502 . . . 1504 may be trained during the process of training a GAN as described above.

In other embodiments, one or more of the vectors in a set W+ may be duplicates. For example, in some embodiments all of the n vectors in a given set W+ may be duplicates, in which case the same function f(Z) may be used to generate all of them.

In any embodiments, the sets W+ may be computed when needed or may be computed once and stored for later retrieval, also as described above.

Other modes of representation for the source artifacts, and/or for use as inputs to a GNN to generate the source artifacts, are also possible. For example, in embodiments that are based on neural networks, the modes of representation may be varied according to the architecture of the neural networks on which the embodiments are to be based. The source vectors 1205 that are determined by block 1204 may correspond to any of the modes described above in relation to grids 1304, 1306 or 1308, or to other modes as appropriate. Similarly, any of these modes of representation or others may be used for references that may be stored in data structures 1202.

Referring again now to FIG. 12, a block 1206 may be provided to perform the function indicated in step 1110, which is to determine one or more resultant vectors 1207 based on source vectors 1205. A resultant vector may serve as a source attribute representation since it represents a combination of attributes from selected ones of the source artifacts.

In embodiments according to FIG. 12, block 1206 may produce a single resultant vector RV based on multiple source vectors SV. It may do so according to a variety of techniques. According to one example technique, the source vectors may be represented using one of the modes corresponding to grids 1304 or 1306 described above (i.e., each source vector may correspond to a Z value or to a W value). Given either of those modes of representation for the source vectors, block 1206 may compute each element of a resultant vector by averaging the corresponding elements of the source vectors. For example, given two source vectors $SV_A$ and $SV_B$, each comprising n elements, block 1206 may separately compute n elements for a resultant vector RV such that each element $RV_i$ is equal to the average of $SV_{Ai}$ and $SV_{Bi}$. The same technique can be applied when more than two source artifacts are included in a selected set.

Another example technique may be employed in embodiments that determine weights for each of the source artifacts included in a given selected set, as generally described above in relation to the example user interfaces. In this category of embodiments, block 1206 may be given access to individual weighting values for each of the source artifacts that are included in a selected set, as indicated at 1212, so that block 1206 may take the weights into account when determining the resultant vector. As an example, assume that two source vectors $SV_A$ and $SV_B$ each comprise n elements. Assume further that the source vectors are represented according to either of modes 1304 or 1306 (i.e., each is represented by a Z value, or each is represented by a W value). Given these source vector representations, block 1206 may separately compute n elements for a resultant vector RV such that each element $RV_i$ is equal to a weighted average of $SV_{Ai}$ and $SV_{Bi}$. Multiple techniques are available for doing so. One technique is to assign weights to the members of the selected set such that all of the weights sum to 1.0. In this manner, for a selected set that includes source artifacts A and B and wherein artifacts A and B have the assigned weights $weight_A$ and $weight_B$, respectively, each of the resultant vector elements $RV_i$ can be set equal to the sum of $weight_A * SV_{Ai}$ and $weight_B * SV_{Bi}$. The same technique can be applied when more than two source artifacts are included in a selected set. Other weighting techniques are also possible including, without limitation, any of the interpolation techniques described above.

Once the resultant vector has been determined, it may be applied to an output artifact generation block 1208, as shown at 1207, to produce an output artifact 1210. Such an output artifact generation block may be implemented using any type of artifact generator that is capable of producing an output artifact based on a resultant vector as described above.

Figure 16:
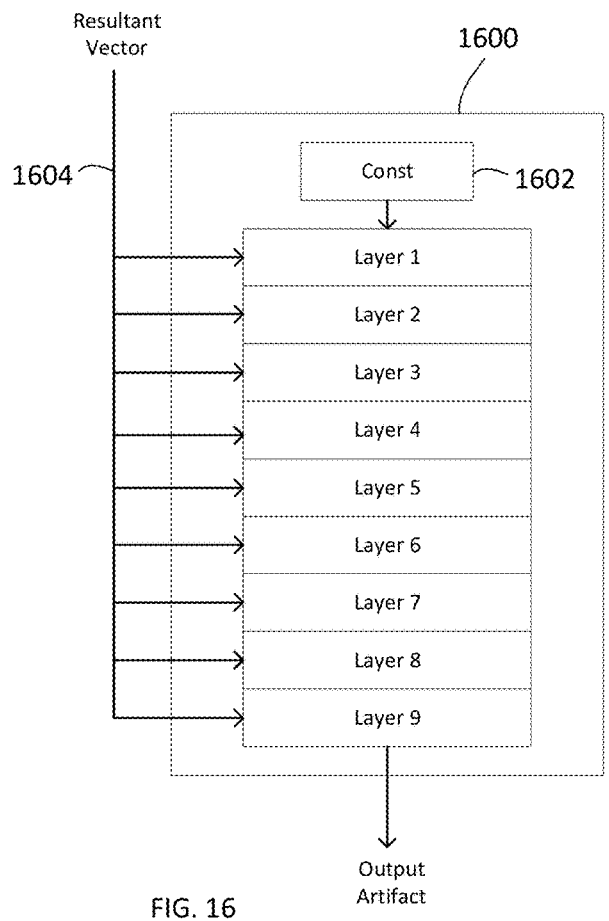
FIG. 16 is a block diagram schematically illustrating an example technique, in accordance with embodiments, for using a layered neural network to generate an output artifact based on a resultant vector.

In some embodiments, the output artifact generator may comprise a GNN. For purposes of explanation, FIG. 16 shows one example GNN architecture 1600 that may be suitable for use as an output artifact generator in the latter types of embodiments. Persons having skill in the art and having reference to this disclosure will appreciate, however, that GNNs having other architectures may also be employed to generate an output artifact. GNNs typically comprise multiple layers, as exemplified by layers 1-9 in the illustrated embodiment. For example, in a GNN for generating images, layer 1 may produce a low resolution image (e.g., 4×4 pixels). The output of layer 1 may be fed to layer 2, which may produce a higher resolution image (e.g., 16×16 pixels), and so on until a relatively high resolution image is produced by the last layer (e.g., 1024×1024 pixels). The output of the last layer may comprise the output artifact. The number of layers shown in embodiment 1600 is chosen only for purposes of illustration and explanation. In other embodiments, the number of layers may differ. Further details regarding suitable implementations for GNNs such as GNN 1600 may be found in Karras, et al., "A Style-Based Generator Architecture for Generative Adversarial Networks," arXiv:1812.04948v3 [cs.NE] (2019), and in Karras, et al., "Analyzing and Improving the Image Quality of StyleGAN," arXiv:1912.04958v2 [cs.CV] (2020).

For embodiments in which only a single resultant vector is produced, the same resultant vector may be applied as an input to each of the layers of the GNN, as indicated at 1604. In embodiments that employ different GNN architectures, the single resultant vector may instead by applied as an input to layer 1 in lieu of the constant input to layer 1 shown in the drawing. Moreover, separate inputs may additionally be provided to one or more layers depending on the architecture of the GNN. For example, according to some architectures, a constant value may be applied as an additional input to layer 1 as indicated at 1602, and noise inputs (not separately shown) may additionally be provided to each of the layers—for example during GAN training, or to produce desired effects during the generation of output artifacts by a trained GNN. Other methods of applying resultant vectors to a generator are also possible.

Figure 17:
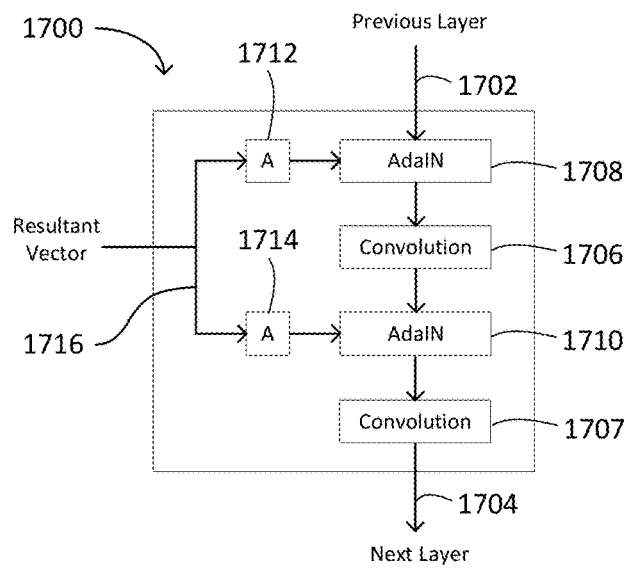
FIG. 17 is a block diagram schematically illustrating an example method in accordance with embodiments for applying the resultant vector of FIG. 16 to one of the layers of a neural network.

FIG. 17 provides a more detailed view of a representative layer 1700 within a GNN such as GNN 1600. Again, however, it should be noted that the architectures of GNNs vary. Persons having skill in the art and having reference to this disclosure will appreciate that the architecture shown in FIG. 17 may be modified as appropriate for different GNN architectures. Layer 1700 may generally represent any of layers 1-9 in embodiment 1600. A GNN layer 1700 may take input from a previous layer, as shown at 1702, and may provide an output for a subsequent layer as shown at 1704. Within a layer 1700, one or more convolution modules 1706, 1707 may be provided, along with one or more additional processing modules such as adaIN modules 1708, 1710 and affine transformation modules 1712, 1714. An adaIN module may implement the function of adaptive instance normalization as explained, for example, in Karras, supra. The transformations applied by each of the affine transformation modules may be unique and may be learned, for example, in conjunction with training a GAN as described above. Outputs of the learned affine transformation modules may be coupled as inputs to respective ones of the adaIN modules, as shown. In architectures of this kind, the resultant vector may be provided as an input to each one of the affine transformation modules as indicated at 1716. Persons having skill in the art will appreciate that other processing modules not shown in FIG. 17 may also be present in a representative GNN layer, and that the definition of which modules constitute a single layer in a given architecture may vary. For example, in some architectures, a layer may be defined to include only a single adaIN module and a single convolution module, potentially along with other associated processing modules.

Figure 18:
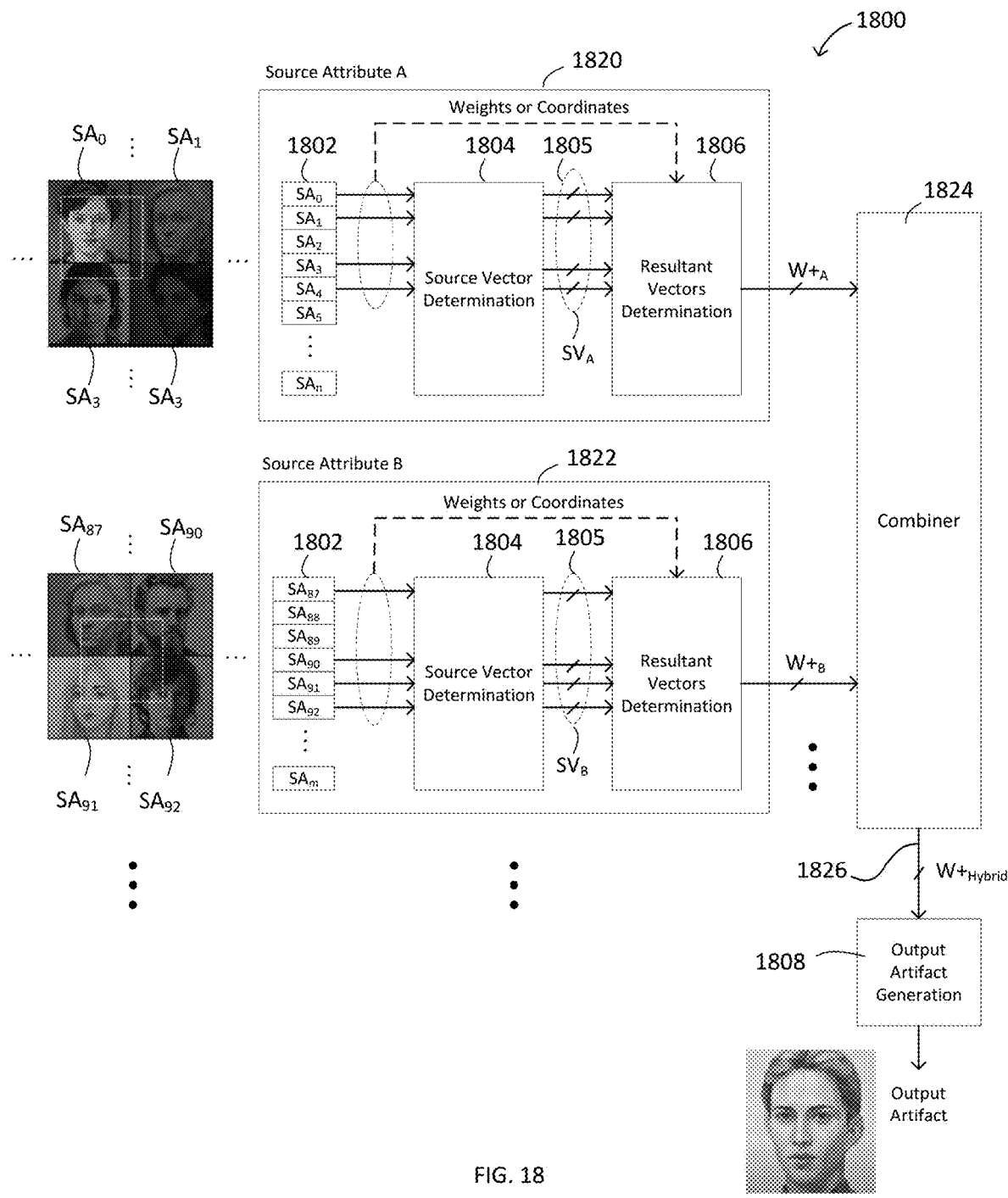
FIG. 18 is a block diagram illustrating further example structures, in accordance with embodiments, that may be used to implement the example methods.

FIG. 18 illustrates a further category of embodiments, 1800, in which the output artifact may exhibit multiple output attributes, each of which represents a different source attribute selected from among the source artifacts as described above. Although images are shown in the drawing to facilitate explanation, embodiments 1800 are not limited to image artifacts, but may be employed with any of the artifact types described above for which a suitable output artifact generator may be devised.

Two source attribute selection modules 1820, 1822 are shown in the illustrated embodiment. For implementations in which it is desired to select different source attributes concurrently, multiple source attribute selection modules similar to modules 1820, 1822 may be provided. In other embodiments, a single source attribute selection module may be provided and used to select different source attributes sequentially. Each of the source attribute selection modules may be implemented in a similar manner as was described above in relation to the structures of FIG. 12. Thus, data structures 1802 may be similar to data structures 1202, source vector determination blocks 1804 may be similar to source vector determination block 1204, and resultant vector determination blocks 1806 may be similar to resultant vector determination block 1206. Although only two source attribute selection modules are shown in the example embodiment, additional such selection modules may be employed in further embodiments, or the same selection module may be employed sequentially to enable selection from among more than two types of source attributes. As was described above, the source artifacts from which the different attribute types are selected may comprise the same set of source artifacts, or they may comprise different sets of source artifacts.

The same variety of modes can be employed to represent source artifacts 1802 and source vectors $SV_A$, $SV_B$ as may be employed to represent corresponding entities in the embodiments of FIG. 12. In embodiments 1800, however, the W+ mode of representation (which corresponds to mode 1308 in FIG. 13) is used to represent the resultant vectors that are determined by each of blocks 1806. Similarly, in some embodiments, the source vectors $SV_A$ and $SV_B$ that are determined by blocks 1804 may also be represented using the W+ mode. For this reason, several of the arrows in FIG. 18 are drawn with slash marks to indicate that each may correspond to multiple vectors, as would be the case when the W+ mode of representation is employed.

When both the source vectors and the resultant vectors are represented in this way, any of the techniques described above in relation to FIG. 12 for determining the elements of a single resultant vector RV may similarly be employed to determine the elements for each resultant vector corresponding to a given W+ artifact representation. By way of example, assume for purposes of illustration that a W+ representation is used for both the source vectors and the resultant vectors in a given embodiment 1800. Assume further that each W+ representation comprises n vectors, and that each vector comprises m elements (m floating point numbers, for example). Each such W+ representation may be viewed as a matrix having n rows and m columns such that the rows in the matrix correspond to vectors and the columns in the matrix correspond to element positions within the vectors. In such embodiments, the elements of a first resultant vector in $W+_A$ may be determined using the first row from each of the matrices corresponding to $SV_A$. Similarly, the elements of the second resultant vector in $W+_A$ may be determined using the second row from each of the matrices corresponding to $SV_A$, and so on until the $n^{th}$ resultant vector in $W+_A$ is determined using the $n^{th}$ row from each of the matrices corresponding to $SV_A$. The same technique may be employed to determine the elements of the resultant vectors in $W+_B$, as well as those for any further source attributes involved in the particular embodiment (e.g., a $W+_C$ source attribute perhaps).

Figure 19:
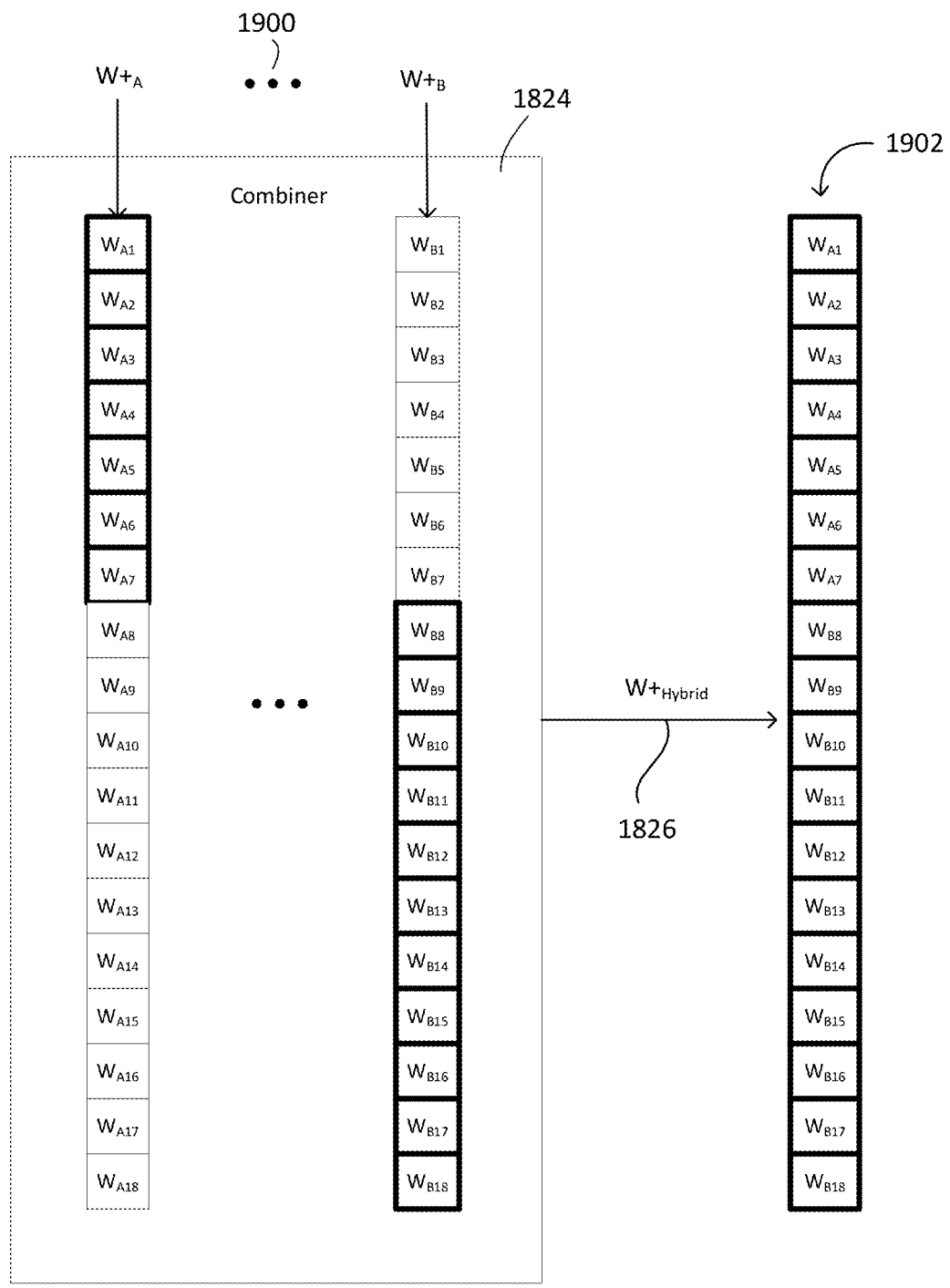
FIG. 19 is a block diagram schematically illustrating an example technique, in accordance with embodiments, for generating a hybrid set of resultant vectors based on multiple input vectors.

The function of combiner module 1824 in embodiments 1800 is to produce a hybrid set of resultant vectors $W+_{Hybrid}$, shown in the drawing as an output 1826 of the combiner module. A hybrid set of resultant vectors is one in which some of the vectors are taken from one source attribute representation, such as from $W+_A$, while others of the vectors are taken from a different source attribute representation, such as from $W+_B$. FIG. 19 provides an example and illustrates one of multiple ways in which this may be done. In FIG. 19, two source attribute representations $W+_A$, $W+_B$ are shown as inputs to the combiner module. In general, more than two source attribute representations may be present, as indicated at 1900. In the example shown, each of the source attribute representations comprises 18 vectors numbered $W_{A1}$ to $W_{A18}$ and $W_{B1}$ to $W_{B18}$, respectively. The hybrid set of resultant vectors 1902 includes some of the vectors from $W+_A$ and some of the vectors from $W+_B$. In this example, set 1902 comprises vectors $W_{A1}$ to $W_{A7}$ from $W+_A$ and vectors $W_{B8}$ to $W_{B18}$ from $W+_B$.

As was described above, some embodiments may generate additional source attribute representations, such as $W+_C$, etc. Regardless of the number source attribute representations that may be used, several constraints may be considered when designing a given implementation. First, the number of vectors in a hybrid set 1902 may comprise the same number of vectors as does each of the contributing source attribute representations. Second, each of the vectors in the hybrid set may comprise the same number of elements as does each of the vectors in the source attribute representations. Third, the positions of the vectors in the hybrid set may be kept consistent with the positions those vectors occupied in the source attribute representations from which they were taken. For example, if vector $W_{A1}$ in the hybrid set occupied row 1 in matrix $W+_A$, then it may occupy row 1 in the hybrid matrix as well, and so on for each of the other vectors in the hybrid set. Fourth, when multiple rows are taken from a given source attribute representation $W+_x$ the rows taken may be contiguous rows. Some or all of these constraints may be omitted or relaxed depending on the results desired, and on the objectives for which a given embodiment is being designed. An example technique for implementing one or more of the above constraints simultaneously is to create the hybrid set by concatenating contiguous rows taken from the source attribute representation matrices. By way of illustration, contiguous rows 1-3 may be taken from one source attribute matrix, contiguous rows 4-12 may be taken from a second source attribute matrix, and contiguous rows 13-18 may be taken from a third source attribute matrix such that the final hybrid set comprises 18 rows representing the concatenation of the three contiguous-row subsets.

Figure 20:
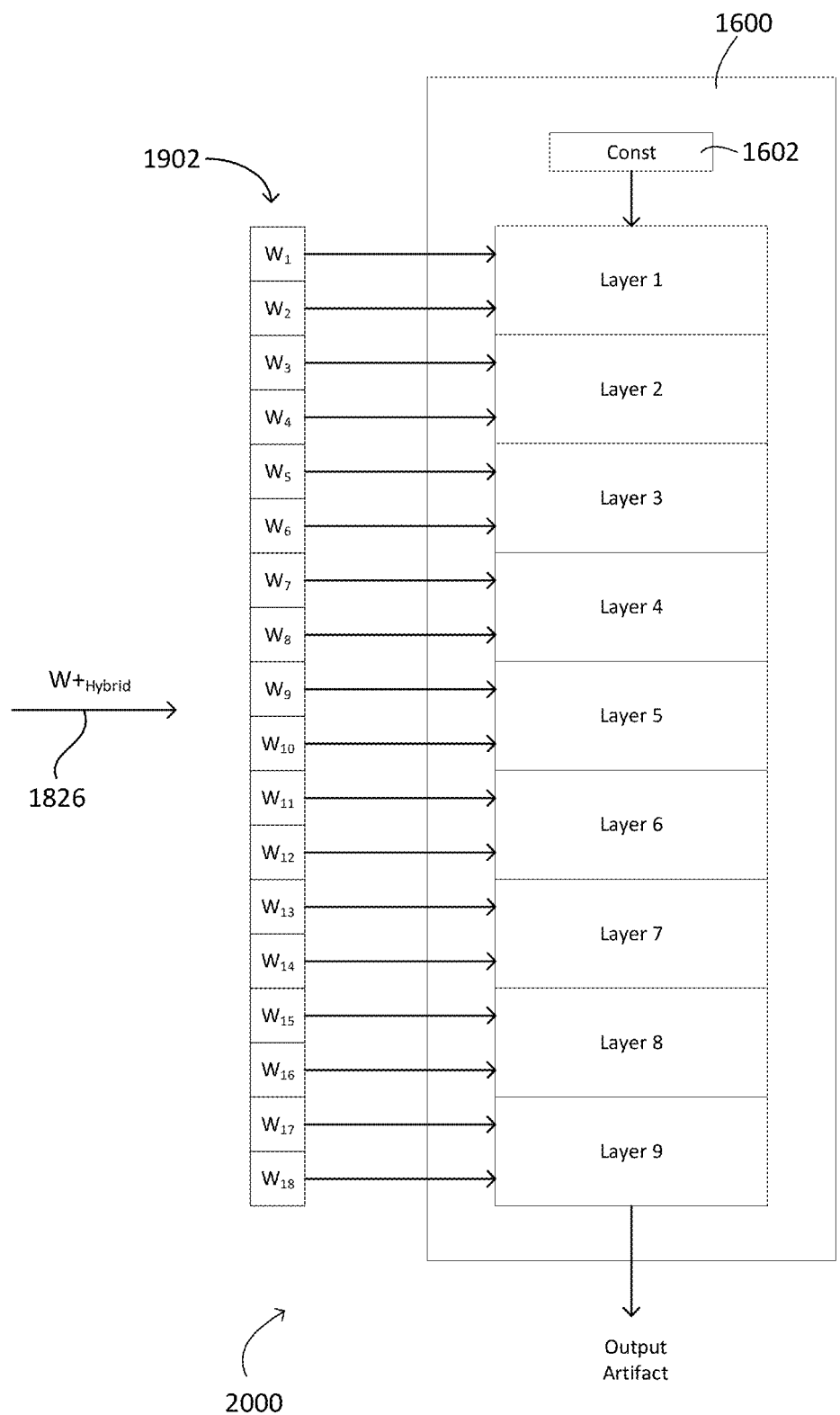
FIG. 20 is a block diagram schematically illustrating an example technique, in accordance with embodiments, for using a layered neural network to generate an output artifact based on a hybrid set of resultant vectors.

Referring again to FIG. 18, output artifact generation block 1808 may comprise any implementation that is capable of generating an output artifact based on the output of the combiner. In the illustrated embodiment, this corresponds to any artifact generator capable of using a W+ mode representation as an input. One example of such a generator is the multilayer GNN 1600 described previously. The manner of applying the input to the generator may also vary in embodiments, as will be apparent to persons having skill in the art and having reference to this disclosure. One example manner of applying a $W+_{Hybrid}$ matrix to a GNN such as GNN 1600 is illustrated in FIG. 20. Rather than applying the same resultant vector to all layers as in the example of FIG. 16, example embodiment 2000 in FIG. 20 applies distinct sets of resultant vectors to each layer of the GNN, as shown. For example, the first two rows of the hybrid matrix are applied to layer 1, the second two rows are applied to layer 2, and so on. Depending on the objectives for which the embodiment is being designed, it may be desirable to maintain consistency between the order of rows in the hybrid matrix and the order of the layers (and sublayers) to which the rows are applied. For example, increasing row numbers in the hybrid matrix may be applied to increasing layer numbers within the GNN, or vice versa.

Figure 21:
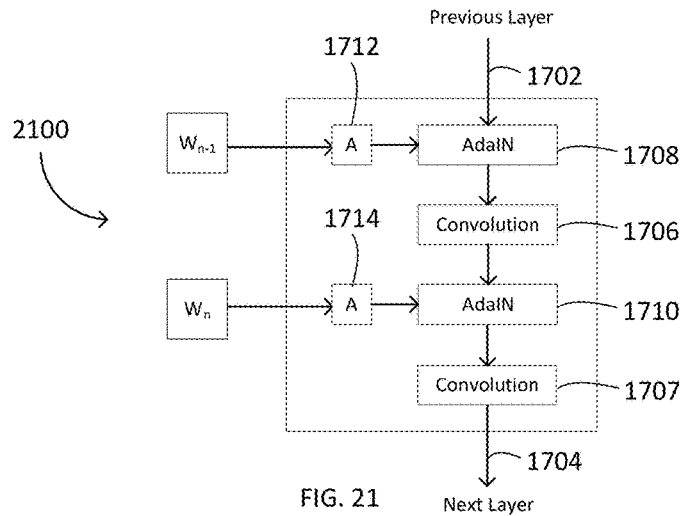
FIG. 21 is a block diagram schematically illustrating an example method in accordance with embodiments for applying the hybrid resultant vectors of FIG. 20 to one of the layers of a neural network.

By way of further example, FIG. 21 shows a more detailed view of an arbitrary layer 2100 within embodiment 2000. For embodiments having a GNN architecture such as the one illustrated, each vector from the hybrid matrix may be applied to a different one of the affine transformation blocks 1712, 1714 within a given GNN layer 1700, as shown.

Other ways of applying vectors of a hybrid matrix to a GNN are also possible. As is evident from example embodiment 2000, for example, the number of rows in a hybrid matrix 1902 need not equal the number of layers in the GNN. While, in the case of embodiment 2000, multiple rows from the hybrid matrix are applied to each layer of the GNN, in other embodiments the number of layers in the GNN may exceed the number or rows in the hybrid matrix. In the latter category of embodiments and potentially others, it may be desirable to apply the same set of rows from the hybrid matrix to more than one layer of the GNN.

Figure 22:
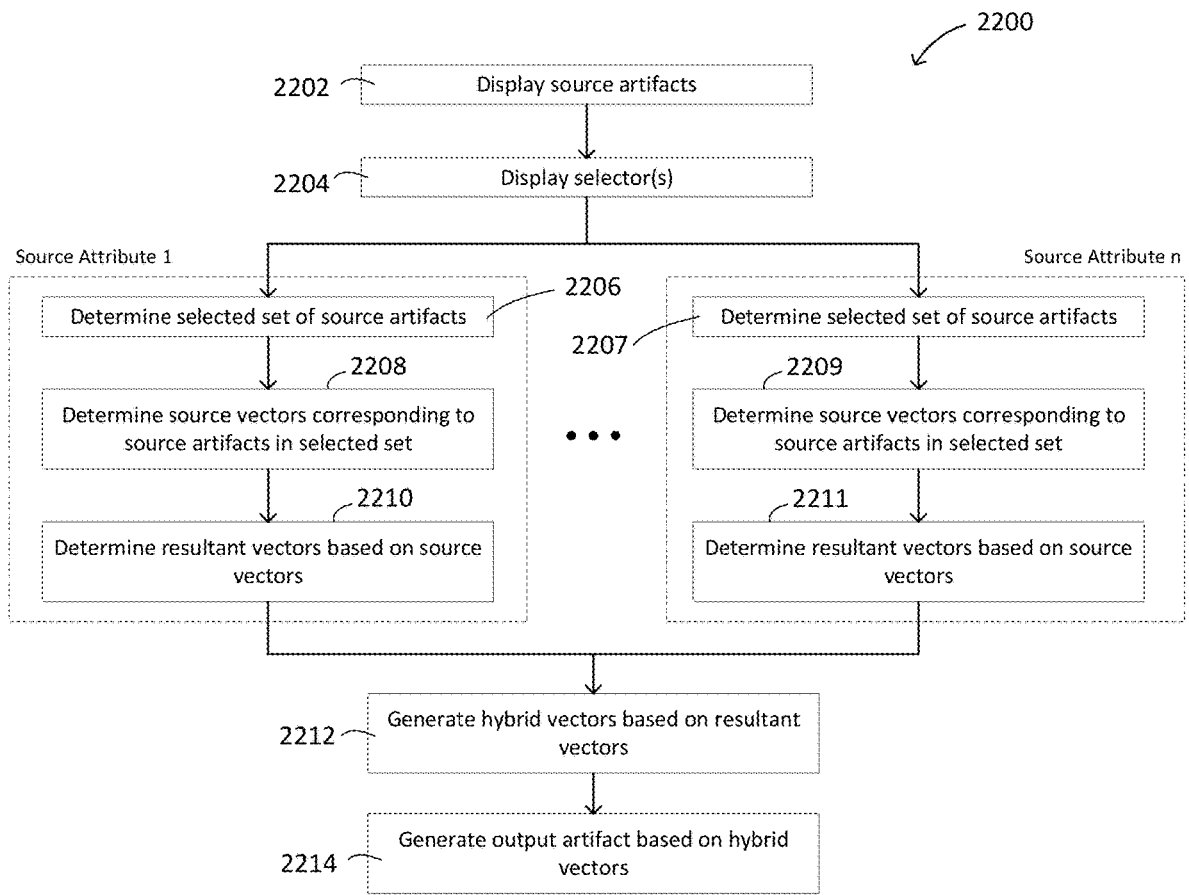
FIG. 22 is a flow diagram illustrating further example methods in accordance with embodiments.

FIG. 22 is a flow diagram illustrating an example class of methods 2200 that may be employed in conjunction with embodiments 1800 or with different embodiments. In steps 2202, 2204 at least one set of source artifacts is displayed, along with one or more selectors that may be moved as described above to indicate one or more selection regions.

Embodiments according to method 2200 enable a user to indicate, using the one or more selectors, selections chosen from multiple different types of source attributes that are represented among the source artifacts. For example, the user may select content attributes from among the displayed source artifacts, and separately may select style attributes from among the displayed source artifacts. Steps 2206, 2208, 2210 correspond to one such source attribute selection, while steps 2207, 2209, 2211 correspond to another of such source attribute selections. Steps 2206, 2208, 2210 may be performed concurrently with steps 2207, 2209, 2211, or they may be performed sequentially relative to steps 2207, 2209, 2211. In further embodiments, additional similar steps may be performed to enable the user to select additional attribute types from among the source artifacts.

In steps 2206, 2207, one or more selected sets of source artifacts are determined corresponding, respectively, to the one or more selection regions indicated by the selectors. In steps 2208, 2209, for each of the selected sets, a corresponding set of source vectors is determined. Steps 2206-2209 may be performed, for example, in the manner described above in relation to FIGS. 10-15. In steps 2210, 2211, for each set of source vectors determined, a set of resultant vectors is determined. Steps 2210, 2211 may be performed, for example, in the manner described above in relation to FIG. 18.

In step 2212, a hybrid set of vectors is generated based on the resultant vectors determined in steps 2210, 2211. In step 2214, an output artifact may be generated based on the hybrid set of vectors. Steps 2212, 2214 may be performed, for example, in the manner described above in relation to FIGS. 19-21.

If desired, additional steps similar to those described above in relation to step 1114 of method 1100 may also be performed.

Choosing to Work with Different Artifact Types

In any embodiments, a user interface element such as a menu may be displayed that enables a user to select from a variety of different artifact types to be used in generating new artifacts based on existing artifacts in accordance with the above-described techniques. In such embodiments, the user's indication of an artifact type may cause source artifacts of the indicated type to be displayed such that the user may select from among the displayed source artifacts to generate a new artifact as described above. Embodiments may store, or be given access to, multiple different types of output artifact generators. In such embodiments, the user's indication of an artifact type may cause the embodiment to use an output artifact generator that corresponds to the indicated artifact type. For example, if a user were to choose video segments as the indicated artifact type, an embodiment may display representations of video segments among the source artifacts and may use a GNN that is trained to produce video segments as the output artifact generator.

Generation of Source Artifacts

In any embodiments, the same output artifact generator that is ultimately used to generate output artifacts may be used beforehand to generate the source artifacts. For example, in embodiments that employ a GNN to generate the output artifacts, some or all of the source artifacts may be generated beforehand by applying random inputs to the same or a similar GNN.

Example Computing Devices

Figure 23:
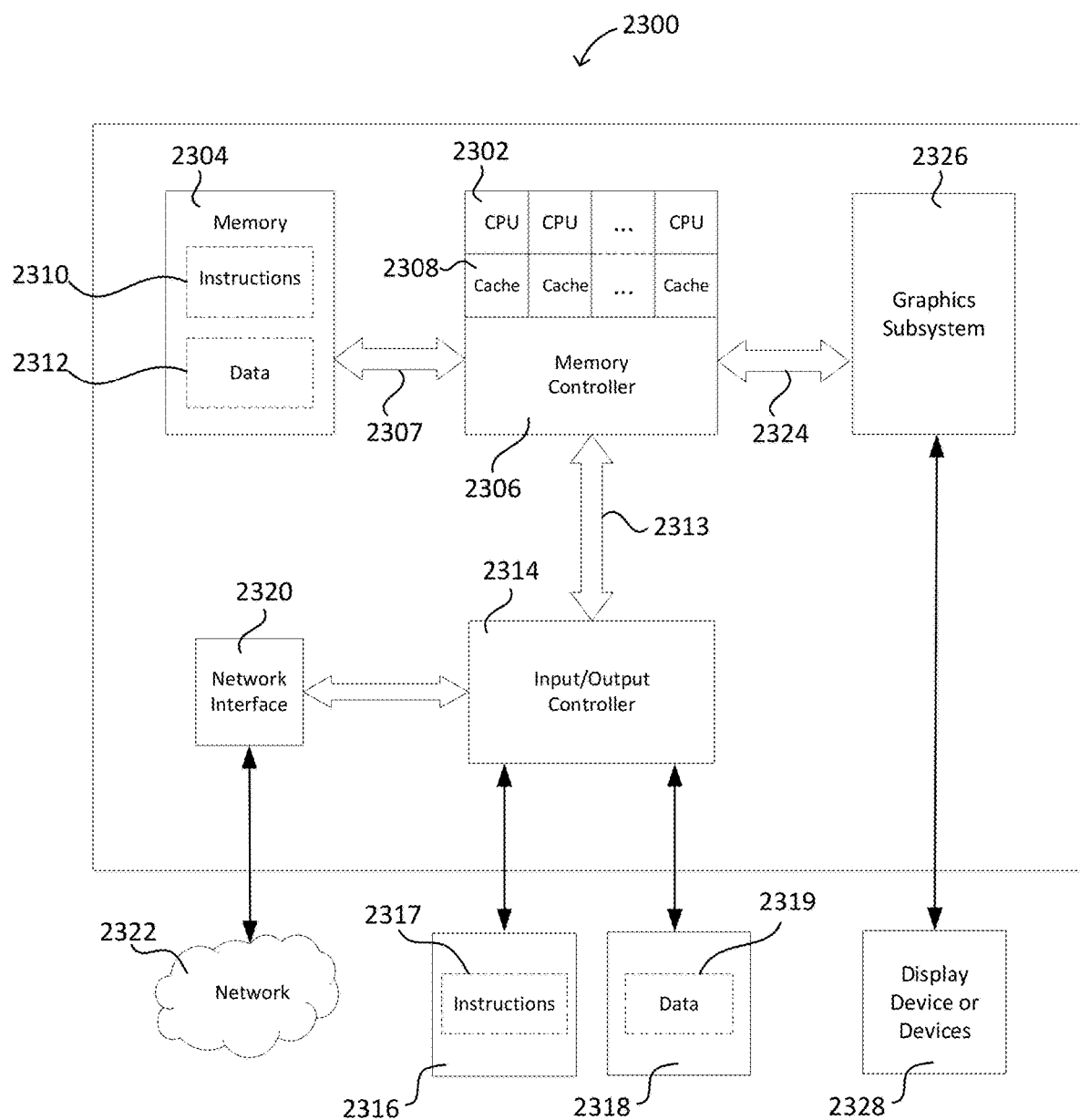
FIG. 23 is a block diagram illustrating various example computing devices that may be used to perform the example methods or to implement the example structures.

FIG. 23 is a block diagram illustrating various computing devices that may be used to perform any of the methods or to implement any of the structures described above. The computing devices illustrated are provided by way of example and not by way of limitation. Persons having skill in the art and having reference to this disclosure will appreciate that alternative or additional types of computing devices may also be employed in conjunction with any of the embodiments described herein.

Computer system 2300 includes one or more central processor unit ("CPU") cores 2302 coupled to a system memory 2304 by a high-speed memory controller 2306 and an associated high-speed memory bus 2307. System memory 2304 typically comprises a large array of random-access memory locations, often housed in multiple dynamic random-access memory ("DRAM") devices, which in turn may be housed in one or more dual inline memory module ("DIMM") packages. Each CPU core 2302 is associated with one or more levels of high-speed cache memory 2308, as shown. Each core 2302 can execute computer-readable instructions 2310 stored in the system memory, and can thereby perform operations on data 2312, also stored in the system memory.

The memory controller is coupled, via input/output bus 2313, to one or more input/output controllers such as input/output controller 2314. The input/output controller is in turn coupled to one or more tangible, non-volatile, computer readable media such as computer-readable medium 2316 and computer-readable medium 2318. Non-limiting examples of such computer-readable media include so-called solid-state disks ("SSDs"), spinning-media magnetic disks, optical disks, flash drives, magnetic tape, and the like. The storage media may be permanently attached to the computer system or may be removable and portable. In the example shown, medium 2316 has instructions 2317 (software) stored therein, while medium 2318 has data 2319 stored therein. Operating system software executing on the computer system may be employed to enable a variety of functions, including transfer of instructions 2310, 2317 and data 2312, 2319 back and forth between the storage media and the system memory.

The memory controller is also coupled to a graphics subsystem 2326 by a second high-speed memory bus 2324. The graphics subsystem may, in turn, be coupled to one or more display devices 2328. While display devices 2328 may be located in physical proximity to the rest of the components of the computer system, they may also be remotely located. Software running on the computer system may generate instructions or data that cause graphics subsystem to display any of the example user interface elements described above on display devices 2328. Such software may also generate instructions or data that cause the display of such elements on one or more remotely located display devices (for example, display devices attached to a remotely located computer system) by sending the instructions or data over network 2322 using an appropriate network protocol. The graphics subsystem may comprise one or more graphics processing units ("GPUs") to accelerate the execution of instructions or to implement any of the methods described above.

Computer system 2300 may represent a single, stand-alone computer workstation that is coupled to input/output devices such as a keyboard, pointing device and display. It may also represent one of the nodes in a larger, multi-node or multi-computer system such as a cluster, in which case access to its computing capabilities may be provided by software that interacts with and/or controls the cluster. Nodes in such a cluster may be collocated in a single data center or may be distributed across multiple locations or data centers in distinct geographic regions. Further still, computer system 2300 may represent an access point from which such a cluster or multi-computer system may be accessed and/or controlled. Any of these or their components or variants may be referred to herein as "computing apparatus," a "computing device," or a "computer system."

In example embodiments, data 2319 may correspond to representations of source artifacts or output artifacts, and instructions 2317 may correspond to algorithms or executable instructions for performing any of the methods described herein. In such embodiments, the instructions, when executed by one or more computing devices such as one or more of the CPU cores, cause the computing device to perform operations described herein on the data, producing results that may also be stored in one or more tangible, non-volatile, computer-readable media such as medium 2318. The word "medium" as used herein should be construed to include one or more of such media.

Any of the user interfaces described above and any of the functional or structural blocks described above in relation to block diagrams or flow diagrams may be implemented as one or more modules. In some embodiments a single such module may implement more than one of the described functional blocks. In other embodiments more than one module may together implement a single functional block. Any or all of such modules may be implemented by using appropriate software, or by using special purpose hardware designed to perform the indicated functions, or by using a combination of these.

CONCLUSION

Multiple specific embodiments have been described above and in the appended claims. Such embodiments have been provided by way of example and illustration. Persons having skill in the art and having reference to this disclosure will perceive various utilitarian combinations, modifications and generalizations of the features and characteristics of the embodiments so described. For example, steps in methods described herein may generally be performed in any order, and some steps may be omitted, while other steps may be added, except where the context clearly indicates otherwise. Similarly, components in structures described herein may be arranged in different positions, locations or groupings, and some components may be omitted, while other components may be added, except where the context clearly indicates otherwise. The scope of the disclosure is intended to include all such combinations, modifications, and generalizations as well as their equivalents.

What is claimed is:

1. A system, comprising:
one or more processors;
one or more memories storing instructions that, when executed by the one or more processors, cause the performance of steps comprising:
displaying a graphical user interface on a display device, wherein the graphical user interface comprises a source region and an output region;
displaying a plurality of source artifacts in the source region;
displaying a selector, wherein the selector is configured to be moved within the source region responsive to user input while the source artifacts are at least temporarily stationary;
responsive to the user input, moving the selector to indicate a first selected set of the at least temporarily stationary source artifacts; and
displaying an output artifact in the output region;
wherein the output artifact comprises a first output attribute that represents a combination of source attributes from the source artifacts in the first selected set;
wherein an amount of contribution to the first output attribute by respective ones of the source artifacts in the first selected set is based on a coordinate of the selector relative to coordinates of the source artifacts in the first selected set; and
wherein the first output attribute is not based on attributes of a displayed artifact, if any, that moves with the selector.

2. The system of claim 1, wherein:
the selector defines an area that intersects at least partially with each of the source artifacts in the first selected set.
3. The system of claim 2, wherein:
the coordinate of the selector comprises a point within the area.
4. The system of claim 1, wherein:
the selector comprises a cursor; and
the coordinate of the selector comprises a position of the cursor.
5. The system of claim 1, wherein the steps further comprise:
determining the amount of contribution by performing an interpolation based on the coordinate of the selector and the coordinates of the source artifacts in the first selected set.
6. The system of claim 1, wherein the steps comprise:
displaying more than one selector, wherein each selector corresponds to a different output attribute of the output artifact.
7. The system of claim 1, wherein the steps comprise:
displaying a multi-mode selector, wherein the multi-mode selector corresponds to different output attributes of the output artifact based on a mode of the selector.
8. The system of claim 1, wherein the steps comprise:
displaying a number of source regions and a number of selectors;
wherein the number of selectors is equal to the number of source regions.
9. The system of claim 1, wherein the steps comprise:
displaying a number of source regions and a number of selectors;
wherein the number of selectors is not equal to the number of source regions.
10. The system of claim 1, wherein the steps comprise:
updating the output artifact continuously responsive to movement of the selector.
11. The system of claim 1, wherein the steps comprise:
updating the output artifact at discrete times responsive to an update input of the graphical user interface.
12. A method, comprising:
displaying a graphical user interface on a display device, wherein the graphical user interface comprises one or more source regions and an output region;
displaying a plurality of source artifacts in the one or more source regions;
displaying two or more selectors, wherein each of the selectors is configured to be moved within at least one of the source regions responsive to user input;
responsive to the user input, moving a first one of the selectors to indicate a first selected set of the source artifacts; and
displaying an output artifact in the output region;
wherein the output artifact comprises a first output attribute that represents a combination of source attributes from the source artifacts in the first selected set;
wherein an amount of contribution to the first output attribute by respective ones of the source artifacts in the first selected set is based on a coordinate of the first selector relative to coordinates of the source artifacts in the first selected set; and
wherein each of the two or more selectors corresponds to a different output attribute of the output artifact.
13. The method of claim 12, wherein:
the first selector defines an area that intersects at least partially with each of the source artifacts in the first selected set.

14. The method of claim 13, wherein:
the coordinate of the first selector comprises a point within the area.
15. The method of claim 12, wherein:
the number of selectors is equal to the number of source regions.
16. One or more non-transitory computer readable media having instructions stored therein that, when executed by one or more processors in one or more computing devices, cause the one or more computing devices to perform steps comprising:
displaying a graphical user interface on a display device, wherein the graphical user interface comprises two or more distinct source regions and an output region;
displaying a plurality of source artifacts in the source regions;
displaying a selector, wherein the selector is configured to be moved within at least one of the source regions responsive to user input;
responsive to the user input, moving the selector to indicate a first selected set of the source artifacts; and
displaying an output artifact in the output region;
wherein the output artifact comprises a first output attribute that represents a combination of source attributes from the source artifacts in the first selected set;
wherein an amount of contribution to the first output attribute by respective ones of the source artifacts in the first selected set is based on a coordinate of the selector relative to coordinates of the source artifacts in the first selected set; and
wherein each of the two or more source regions corresponds to a different output attribute of the output artifact.
17. The media of claim 16, wherein:
the selector defines an area that intersects at least partially with each of the source artifacts in the first selected set.
18. The media of claim 17, wherein:
the coordinate of the selector comprises a point within the area.
19. The media of claim 16, wherein the steps further comprise:
displaying more than one selector, wherein each selector corresponds to a different output attribute of the output artifact.
20. The media of claim 16, wherein the steps further comprise:
displaying a number of source regions and a number of selectors;
wherein the number of selectors is not equal to the number of source regions.
21. The media of claim 16, wherein the steps further comprise:
updating the output artifact continuously responsive to movement of the selector.
22. One or more non-transitory computer readable media having instructions stored therein that, when executed by one or more processors in one or more computing devices, cause the one or more computing devices to perform steps comprising:
displaying a graphical user interface on a display device, wherein the graphical user interface comprises one or more source regions and an output region;
displaying a plurality of source artifacts in the one or more source regions;
displaying one or more selectors, wherein the number of selectors is not equal to the number of source regions, and wherein a first one of the selectors is configured to be moved within at least one of the source regions responsive to user input;

responsive to the user input, moving the first selector to indicate a first selected set of the source artifacts;

displaying an output artifact in the output region;

wherein the output artifact comprises a first output attribute that represents a combination of source attributes from the source artifacts in the first selected set; and wherein an amount of contribution to the first output attribute by respective ones of the source artifacts in the first selected set is based on a coordinate of the first selector relative to coordinates of the source artifacts in the first selected set.

23. The media of claim 22, wherein:

the first selector defines an area that intersects at least partially with each of the source artifacts in the first selected set; and the coordinate of the first selector comprises a point within the area.

24. The media of claim 22, wherein:

the first selector comprises a cursor; and the coordinate of the first selector comprises a position of the cursor.

25. The media of claim 22, wherein:

at least one of the one or more selectors comprises a multi-mode selector, wherein the multi-mode selector corresponds to different output attributes of the output artifact based on a mode of the selector.

26. The media of claim 22, wherein the steps further comprise:

displaying at least two distinct source regions wherein each of the at least two distinct source regions corresponds to a different output attribute of the output artifact.

27. The media of claim 22, wherein the steps further comprise:

updating the output artifact continuously responsive to movement of at least one of the one or more selectors.

28. A method, comprising:

displaying a graphical user interface on a display device, wherein the graphical user interface comprises a source region and an output region;

displaying a plurality of source artifacts in the source region;

displaying a selector, wherein the selector is configured to be moved within the source region responsive to user input;

responsive to the user input, moving the selector to indicate a first selected set of the source artifacts;

displaying an output artifact in the output region;

wherein the output artifact comprises a first output attribute that represents a combination of source attributes from the source artifacts in the first selected set;

wherein an amount of contribution to the first output attribute by respective ones of the source artifacts in the first selected set is based on a coordinate of the selector relative to coordinates of the source artifacts in the first selected set; and wherein the selector comprises a multi-mode selector that corresponds to different output attributes of the output artifact based on a mode of the selector.

29. The method of claim 28, wherein:

the selector defines an area that intersects at least partially with each of the source artifacts in the first selected set.

30. The method of claim 29, wherein:

the coordinate of the selector comprises a point within the area.

31. The method of claim 28, wherein:

the selector comprises a cursor; and the coordinate of the selector comprises a position of the cursor.

32. The method of claim 28, further comprising:

updating the output artifact continuously responsive to movement of the selector.

33. The system of claim 1, wherein:

the output region and the selector are distinct from one another.

* * * * *